US012803711B2

(12) United States Patent
Karaki et al.

(10) Patent No.: US 12,803,711 B2
(45) Date of Patent: Nov. 17, 2026

(54) METHODS FOR OPERATING HYBRID AUTOMATIC REPEAT REQUEST WITH DISABLING PER HYBRID AUTOMATIC REPEAT REQUEST PROCESS

(71) Applicant: Telefonaktiebolaget LM Ericsson (PUBL), Stockholm (SE)

(72) Inventors: Reem Karaki, Aachen (DE); Xingqin Lin, San Josè, CA (US); Sorour Falahati, Stockholm (SE); Havish Koorapaty, Saratoga, CA (US)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 292 days.

(21) Appl. No.: 18/040,837

(22) PCT Filed: Aug. 9, 2021

(86) PCT No.: PCT/EP2021/072195
§ 371 (c)(1),
(2) Date: Feb. 7, 2023

(87) PCT Pub. No.: WO2022/029338
PCT Pub. Date: Feb. 10, 2022

(65) Prior Publication Data
US 2023/0269033 A1 Aug. 24, 2023

Related U.S. Application Data

(60) Provisional application No. 63/062,930, filed on Aug. 7, 2020.

(51) Int. Cl.
*H04L 1/1812* (2023.01)
*H04L 1/1829* (2023.01)
(Continued)

(52) U.S. Cl.
CPC .......... *H04L 1/1812* (2013.01); *H04L 1/1854* (2013.01); *H04L 5/0053* (2013.01);
(Continued)

(58) Field of Classification Search
CPC ... H04L 1/1812; H04L 1/1822; H04L 1/1825; H04L 1/1854; H04L 1/1896;
(Continued)

(56) References Cited

U.S. PATENT DOCUMENTS 7,447,504 B2 * 11/2008 Lohr .................... H04L 1/1887 370/242
8,555,125 B2 * 10/2013 Sahara .................. H04L 1/0003 714/748
(Continued)

FOREIGN PATENT DOCUMENTS

CN 101228732 A * 7/2008 ........... H04L 1/1822
CN 101228732 B * 5/2011 ........... H04L 1/1822
(Continued)

OTHER PUBLICATIONS

3GPP TS 38.213 v16.2.0 (Jun. 2020) 3rd Generation Partnership Project; Technical Specification Group Radio Access Network NR; Physical layer procedures for control (Release 16).
(Continued)

*Primary Examiner* — Eric Nowlin
(74) *Attorney, Agent, or Firm* — Baker Botts L.L.P.

(57) ABSTRACT

A method by a wireless device includes receiving, from a network node, configuration information that enables Hybrid Automatic Repeat Request Acknowledgment (HARQ ACK) and/or Negative Acknowledgment (HARQ NACK) feedback for a first set of HARQ processes and disables HARQ ACK and/or HARQ NACK for a second set of HARQ processes. The wireless device constructs a first HARQ codebook of a first type based on the first set of
(Continued)

HARQ process numbers for first set of HARQ processes for which HARQ ACK and/or HARQ NACK feedback is enabled and sends, to the network node, the HARQ ACK and/or HARQ NACK feedback based on the first HARQ codebook.

20 Claims, 14 Drawing Sheets

(51) Int. Cl.

| | |
|---|---|
| ***H04L 5/00*** | (2006.01) |
| ***H04W 72/1273*** | (2023.01) |
| ***H04W 72/23*** | (2023.01) |
| ***H04W 72/232*** | (2023.01) |

(52) U.S. Cl.
CPC ....... *H04W 72/1273* (2013.01); *H04W 72/23* (2023.01); *H04W 72/232* (2023.01)

(58) Field of Classification Search
CPC ........................ H04L 5/0053; H04W 72/1273; H04W 72/23; H04W 72/232
See application file for complete search history.

(56) References Cited

U.S. PATENT DOCUMENTS

| | | | | |
|---|---|---|---|---|
| 10,440,771 | B2 * | 10/2019 | Chen | H04L 1/1861 |
| 12,308,971 | B2 * | 5/2025 | Li | H04L 1/1854 |
| 2007/0047451 | A1 * | 3/2007 | Lohr | H04L 1/1822 370/242 |
| 2009/0300453 | A1 * | 12/2009 | Sahara | H04L 1/0003 714/748 |
| 2010/0281322 | A1 | 11/2010 | Park et al. | |
| 2014/0269338 | A1 | 9/2014 | Jung et al. | |
| 2016/0261391 | A1 * | 9/2016 | Chen | H04L 1/1861 |
| 2018/0014298 | A1 | 1/2018 | Sun et al. | |
| 2018/0262302 | A1 * | 9/2018 | Bergström | H04L 1/1896 |
| 2020/0029387 | A1 * | 1/2020 | Terry | H04W 72/0453 |
| 2021/0006356 | A1 | 1/2021 | Khoshnevisan et al. | |
| 2021/0014004 | A1 | 1/2021 | Khoshnevisan et al. | |
| 2021/0050950 | A1 | 2/2021 | Zhou et al. | |
| 2021/0211237 | A1 | 7/2021 | Yang et al. | |
| 2021/0219329 | A1 | 7/2021 | Zhou et al. | |
| 2021/0288756 | A1 | 9/2021 | Shrestha et al. | |
| 2021/0391952 | A1 * | 12/2021 | Hofström | H04L 1/1864 |
| 2022/0038243 | A1 | 2/2022 | Shrestha et al. | |
| 2022/0052790 | A1 | 2/2022 | Lei et al. | |
| 2022/0158770 | A1 * | 5/2022 | Hong | H04L 5/0091 |
| 2022/0163346 | A1 | 5/2022 | Han et al. | |
| 2022/0272673 | A1 * | 8/2022 | Yang | H04L 5/0055 |
| 2022/0286235 | A1 * | 9/2022 | Ranta-Aho | H04L 1/1896 |
| 2022/0286242 | A1 * | 9/2022 | Khan | H04W 72/23 |
| 2022/0286246 | A1 * | 9/2022 | Bae | H04L 1/1812 |
| 2022/0377812 | A1 | 11/2022 | Jung et al. | |
| 2022/0416951 | A1 * | 12/2022 | Li | H04L 5/0055 |
| 2023/0023656 | A1 | 1/2023 | Rastegardoost et al. | |
| 2023/0057476 | A1 * | 2/2023 | Li | H04L 1/1864 |
| 2023/0076328 | A1 | 3/2023 | Harada et al. | |
| 2023/0145930 | A1 | 5/2023 | Park et al. | |
| 2023/0239869 | A1 | 7/2023 | Wu et al. | |
| 2023/0319822 | A1 | 10/2023 | Park et al. | |
| 2024/0014944 | A1 * | 1/2024 | Hu | H04L 1/1854 |
| 2025/0132867 | A1 * | 4/2025 | Al-Imari | H04L 1/1614 |

FOREIGN PATENT DOCUMENTS

| | | | | | |
|---|---|---|---|---|---|
| CN | 108289015 | A | | 7/2018 | |
| CN | 115943583 | A | * | 4/2023 | H04L 1/1685 |
| EP | 1748593 | A1 | * | 1/2007 | H04L 1/1822 |
| EP | 2120382 | A2 | * | 11/2009 | H04L 1/1822 |
| EP | 1748593 | B1 | * | 12/2009 | H04L 1/1822 |
| EP | 2120382 | B1 | * | 10/2012 | H04L 1/1822 |
| EP | 3667981 | A1 | | 6/2020 | |
| EP | 4054098 | A1 | * | 9/2022 | H04L 5/0055 |
| EP | 4136793 | B1 | * | 9/2024 | H04W 72/0446 |
| EP | 4436078 | A2 | * | 9/2024 | H04W 72/0446 |
| ES | 2335417 | T3 | * | 3/2010 | H04L 1/1822 |
| ID | P202309144 | A | * | 12/2023 | |
| JP | 2023043889 | A | * | 3/2023 | H04W 72/21 |
| KR | 20220163346 | A | * | 12/2022 | H04L 1/1822 |
| TW | 202310582 | A | * | 3/2023 | H04L 1/1896 |
| TW | 1810033 | B | * | 7/2023 | H04L 5/0055 |
| WO | WO-2007017071 | A1 | * | 2/2007 | H04L 1/1822 |
| WO | WO2019029727 | A1 | | 2/2019 | |
| WO | WO2019160483 | A1 | | 8/2019 | |
| WO | WO2019222881 | A1 | | 11/2019 | |
| WO | WO2020093336 | A1 | | 5/2020 | |
| WO | WO-2021024121 | A1 | * | 2/2021 | H04L 1/1822 |
| WO | 2021 064681 | A1 | | 4/2021 | |
| WO | WO-2022000393 | A1 | * | 1/2022 | H04W 72/0446 |
| WO | WO-2022206460 | A1 | * | 10/2022 | H04L 1/1812 |
| WO | WO-2023212522 | A1 | * | 11/2023 | H04L 1/1812 |

OTHER PUBLICATIONS

Official Action issued by Intellectual Property India for Application No. 2023/17014634—Jun. 3, 2024.

3GPP TSG RAN WG1 Meeting #99; Reno, Nevada, US, Nov. 18-22, 2019; Agenda Item: 7.2.5.4; Source: MediaTek Inc.; Title: Summary of 7.2.5.4 on more delay-tolerant re-transmission mechanisms in NR-NTN (R1-1913369).

3GPP TSG RAN WG1 Meeting #99; Reno, USA, Nov. 18-22, 2019; Source: Sony; Title: Discussion on delay-tolerant HARQ for NTN; Agenda Item: 7.2.5.4 (R1-1912349).

Notice of Reasons for Rejection issued for Japanese Patent Application Serial No. 2023-508552—Mar. 22, 2024.

3GPP TR 38.811 V15.3.0 (Jul. 2020); 3rd Generation Partnership Project; Technical Specification Group Radio Access Network; Study on New Radio (NR) to support(Release 15).

3GPP TSG-RAN WG2 #111-e, e-Meeting; Title: Enhancements for NTN on MAC Layer—Impact Analysis on TS; Source: Nomor Research GmbH, Thales (R2-2006702)—Aug. 17-28, 2020.

3GPP TSG RAN meeting #80, La Jolla, USA; Source: Thales; Title: Study on solutions evaluation for NR to support Non Terrestrial Network (RP-181370)—Jun. 11-14, 2018.

3GPP TR 38.821 v16.0.0 (Dec. 2019) Technical Report; 3rd Generation Partnership Project; Technical Specification Group Radio Access Network; Solutions for NR to support non-terrestrial networks (NTN) (Release 16).

PCT International Search Report issued for International application No. PCT/EP2021/072195—Nov. 23, 2021.

PCT Written Opinion of the International Searching Authority issued for International application No. PCT/EP2021/072195—Nov. 23, 2021.

Office Action issued by the USPTO for U.S. Appl. No. 18/040,847—Apr. 28, 2025.

Notice of First Review issued for Application No. 202180068314.3—May 30, 2025.

Search Report issued for Chinese Patent Application No. 2021800683143—May 26, 2025.

3GPP TR 38.811 V15.1.0 (Jun. 2019); 3rd Generation Partnership Project; Technical Specification Group Radio Access Network; Study on New Radio (NR) to support non-terrestrial networks (Release 15).

3GPP TS 38.213 V15.6.0 (Jun. 2019); 3rd Generation Partnership Project; Technical Specification Group Radio Access Network; NR; Physical layer procedures for control (Release 15).

3GPP TSG-RAN WG2 Meeting #107bis; Chongqing, China, Oct. 14-18, 2019; Agenda item: 6.6.3.1; Source: Nokia, Nokia Shanghai Bell; Title: Discussion on LCP procedure for NTN (R2-1913388 (Revision of R2-1911286)).

3GPP TSG-RAN WG2 #107bis; Chongqing, China, Oct. 14-18, 2019; Agenda Item: 6.6.3.1; Source: Ericsson; Title: DRX adaptions for NTN (Tdoc R2-1913582).

(56) References Cited

OTHER PUBLICATIONS

3GPP TSG RAN WG1 Meeting #98bis; Chongqing, China, Oct. 14-20, 2019; Source: Nokia, Nokia Shanghai Bell; Title: Considerations on HARQ in NTN; Agenda Item: 7.2.5.4 (R1-1911222).
3GPP Tsg-Ran WG1 Meeting #102-e; e-Meeting, Aug. 17-28, 2020; Agenda Item: 8.4.3; Source: Ericsson; Title: On HARQ enhancements for NTN (R1-2006465).
3GPP TSG Ran WG1 Meeting #99; Reno, USA, Nov. 18-22, 2019; Source: Nokia, Nokia Shanghai Bell; Title: Considerations on HARQ in NTN; Agenda Item: 7.2.5.4 (R1-1913019).
3GPP TSG RAN WG1 Meeting #97; Reno, USA, May 13-17, 2019; Agenda item: 7.2.2.2.3; Source: Huawei; Title: Feature lead summary of HARQ enhancements for NR-U (R1-1907652).
3GPP TSG RAN meeting #86; Sitges, Spain, Dec. 9-13, 2019; Source: Thales; Title: Solutions for NR to support non-terrestrial networks (NTN); Agenda Item: 9.1.2—Proposals led by RAN2 (RP-193234 (revision from RP-192502, 3144)).
3GPP TSG-RAN WG2 Meeting 107bis; Chongqing, Oct. 14-18, 2019; Agenda Item: 6.6.3.1; Source: CMCC, Huawei, HiSilicon, Sony, KT Corp., NEC, Nomor; Title: Further consideration on HARQ configuration in NTN (R2-1914197 (Revised on R2-1913975)).
3GPP TS 38.212 v16.2.0 (Jun. 2020) 3rd Generation Partnership Project; Technical Specification Group Radio Access Network; NR; Multiplexing and channel coding (Release 16).
3GPP TS 38.214 v16.2.0 (Jun. 2020) 3rd Generation Partnership Project; Technical Specification Group Radio Access Network; NR; Physical layer procedures for data (Release 16).
3GPP TSG RAN meeting #88e; e-meeting, Jun. 29-Jul. 3, 2020; Source: Thales; Title: Solutions for NR to support non-terrestrial networks (NTN) (RP-201256).
Official Action issued for Korean Patent Application No. 10-2023-7008033—Jan. 5, 2026.
3GPP TSG-RAN3 Meeting #101; Gothenburg, Sweden, Aug. 20-24, 2018; Title: (TP for NR BL CR for TS38.423) ANR; Source: Huawei; Agenda Item: 31.3.1.8 (R3-185142).
Notice of Allowance issued for Malaysian Patent Application No. PI 2023000590—Apr. 16, 2026.
3GPP TS 38.304 v16.2.0 (Sep. 2020) 3rd Generation Partnership Project; Technical Specification Group Radio Access Network; NR; User Equipment (UE) procedure in Idle mode and RRC Inactive state (Release 16).
PCT Written Opinion of the International Searching Authority issued for International application No. PCT/EP2021/072202—Nov. 23, 2021.
PCT International Search Report issued for International application No. PCT/EP2021/072202—Nov. 23, 2021.
PCT Written Opinion of the International Searching Authority and PCT International Search Report issued for International application No. PCT/IB2020/059279—Dec. 12, 2020.
PCT International Preliminary Report on Patentability issued for International application No. PCT/IB2020/059279—Mar. 4, 2022.

* cited by examiner

| | | | | | |
|---|---|---|---|---|---|
| Serving Cell 0 | (1,2) | (3,3) | (4,5) | | |
| Serving Cell 1 | (2,2) | | (5,5) | | (6,6) |
| Monitoring Occation | 0 | 1 | 2 | 3 | 4 |

DCI present

FIGURE 3

METHODS FOR OPERATING HYBRID AUTOMATIC REPEAT REQUEST WITH DISABLING PER HYBRID AUTOMATIC REPEAT REQUEST PROCESS

PRIORITY

This nonprovisional application is a U.S. National Stage Filing under 35 U.S.C. § 371 of International Patent Application Serial No. PCT/EP2021/072195 filed Aug. 9, 2021 and entitled "METHODS FOR OPERATING HYBRID AUTOMATIC REPEAT REQUEST WITH DISABLING PER HYBRID AUTOMATIC REPEAT REQUEST PROCESS" which claims priority to U.S. Provisional Patent Application No. 63/062,930 filed Aug. 7, 2020, both of which are hereby incorporated by reference in their entirety.

TECHNICAL FIELD

The present disclosure relates, in general, to wireless communications and, more particularly, systems and methods for operating Hybrid Automatic Repeat Request (HARQ) with disabling per HARQ process.

BACKGROUND

In 3rd Generation Partnership Project (3GPP) Release 15, the first release of the 5G system (5GS) was developed. This is a new generation's radio access technology intended to serve use cases such as enhanced mobile broadband (eMBB), ultra-reliable and low latency communication (URLLC) and Massive Machine Type Communications (mMTC). 5G includes the New Radio (NR) access stratum interface and the 5G Core Network (5GC). The NR physical and higher layers are reusing parts of the Long Term Evolution (LTE) specification, and to that add needed components when motivated by the new use cases.

In Release 15, 3GPP started the work to prepare NR for operation in a Non-Terrestrial Network (NTN). The work was performed within the study item "NR to support Non-Terrestrial Networks" and resulted in 3GPP TR 38.811. In Release 16, the work to prepare NR for operation in an NTN network continues with the study item "Solutions for NR to support Non-Terrestrial Network". See, RP-181370, Study on solutions evaluation for NR to support non-terrestrial Network.

A satellite radio access network usually includes the following components:

- A satellite that refers to a space-borne platform.
- An earth-based gateway that connects the satellite to a base station or a core network, depending on the choice of architecture.
- Feeder link that refers to the link between a gateway and a satellite
- Service link that refers to the link between a satellite and a UE.

Two popular architectures are the bent pipe transponder and the regenerative transponder architectures. In the first case, the base station is located on earth behind the gateway, and the satellite operates as a repeater forwarding the feeder link signal to the service link, and vice versa. In the second case, the satellite carries the base station and the service link connects it to the earth-based core network.

Depending on the orbit altitude, a satellite may be categorized as low earth orbit (LEO), medium earth orbit (MEO), or geostationary earth orbit (GEO) satellite.

- LEO: typical heights ranging from 250-1,500 km, with orbital periods ranging from 90-120 minutes.
- MEO: typical heights ranging from 5,000-25,000 km, with orbital periods ranging from 3-15 hours.
- GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Hybrid automatic repeat request (HARQ) protocol is one of the most important features in NR. Together with link adaptation through channel state information (CSI) feedback and HARQ acknowledgement (HARQ ACK)/HARQ Negative Acknowledgement (HARQ NACK), HARQ enables efficient, reliable and low delay data transmission in NR.

Existing HARQ procedures at the physical layer (PHY) and Medium Access Control (MAC) layer have been designed for terrestrial networks where the Return Trip Time (RTT) propagation delay is usually restricted to within 1 ms. With HARQ protocol, a transmitter needs to wait for the feedback from the receiver before sending new data. In case of a HARQ NACK, the transmitter may need to resend the data packet. Otherwise, it may send new data. This stop-and-wait (SAW) procedure introduces inherent latency to the communication protocol, which may reduce the link throughput. To alleviate this issue, existing HARQ procedure allows activating multiple HARQ processes at the transmitter. That is, the transmitter may initiate multiple transmissions in parallel without having to wait for a HARQ completion. For example, with 16 HARQ processes in NR downlink (DL), the gNodeB (gNB) may initiate up to 16 new data transmissions without waiting for an HARQ ACK for the first packet transmission. Note that there are sufficient number of HARQ processes for terrestrial networks where the propagation delay is typically less than 1 MS.

FIG. 1 illustrates HARQ protocol. As illustrated, the various delays associated with the HARQ procedure may include:

1. The packet first reaches the receiver after a propagation delay Tp.
2. The receiver sends the feedback after a processing/slot delay T1.
3. The feedback reaches the data transmitter after a propagation delay Tp.
4. The transmitter may send a retransmission or new data after a processing/slot delay T2.

To avoid HARQ stalling, the minimum required number of HARQ processes is ceil(2Tp+T1+T2)/Ts) where Ts refers to the slot duration in NR.

Existing HARQ procedures in NR have largely been designed for terrestrial networks where the propagation delay is typically limited to 1 ms. We now highlight the main issues with existing HARQ protocol amid large propagation delays.

The existing HARQ mechanism may not be feasible when the propagation delay is much larger than that supported by the allowed number of HARQ processes. For example, consider the scenario where NR DL is to be adopted for satellite communications. For the GEO case, the RTT propagation delay can be around 500 ms. With 16 HARQ processes supported in NR and with 1 ms slot duration, the available peak throughput as a percentage of the total channel capacity is very low. Table 1 summarizes the available peak throughput for a UE for LEO, MEO and GEO satellites.

TABLE 1

Required number of HARQ processes in satellite networks. The peak throughput with 16 HARQ processes and Ts = 1 ms is also listed.

| Satellite | Total delay | Reqd. # HARQ processes | Available peak throughput (% of peak capacity) |
|---|---|---|---|
| LEO | ~50 ms | ~50 | ~32% |
| MEO | ~180 ms | ~180 | ~8.9% |
| GEO | ~600 ms | ~600 | ~2.7% |

Without a sufficient number of HARQ processes, the sheer magnitude of the propagation delay may render closed-loop HARQ communication impractical.

The number of HARQ processes supported by the existing HARQ protocol is not sufficient to absorb the potentially large propagation delays in non-terrestrial networks. For example, Table 1 demonstrates that a substantial increase in the existing number of HARQ processes is required for operating HARQ amid large propagation delays. Unfortunately, Rel-15 NR supports a maximum of 16 HARQ processes in UL/DL, and it is challenging to support a greater number of HARQ processes (especially at the UE) for at least the following reasons.

a. It requires large memory at both the transmitter and receiver.
b. It may require reducing the HARQ buffer size (and thus the maximum supported TBS).
c. A large number of HARQ buffers implies a large number of HARQ receivers.
d. It may increase the signaling overhead for HARQ ID. In NR, the HARQ process ID is indicated in the DCI and currently there are 4 bits in the HARQ process number field to indicate this. Increasing the number of HARQ processes to 500 would require around 9 bits (more than double the current 4 bits in the HARQ process number field).

In short, the existing (PHY/MAC) HARQ mechanism is ill-suited to non-terrestrial networks with large propagation delays. Moreover, there is no existing signaling mechanism for disabling HARQ at the PHY/MAC layers.

In order to adapt HARQ to non-terrestrial networks, one solution is to semi-statically enable/disable HARQ feedback. To this end, the following agreements were made in RAN2 #107:

It should be possible to enabled/disabled HARQ feedback semi-statically by RRC signalling The enabling/disabling of HARQ feedback should be configurable on a per UE and per HARQ process basis According to the above agreement, there is no feedback for transmission if HARQ is disabled. Furthermore, according to the above agreement, a UE can be configured with a mixture of both feedback disabled HARQ processes and feedback enabled HARQ processes as the configuration is on a per UE and per HARQ process basis.

In NR, when receiving a Physical Downlink Shared Channel, PDSCH, in the downlink from a serving gNB at slot n, a UE feeds back a HARQ ACK at slot n+k over a PUCCH (Physical Uplink Control Channel) resource in the uplink to the gNB if the PDSCH is decoded successfully. Otherwise, the UE sends a HARQ NACK at slot n+k to the gNB to indicate that the PDSCH is not decoded successfully.

For DCI format 1-0, k is indicated by a 3-bit PDSCH-to-HARQ-timing-indicator field. For DCI format 1-1, k is indicated either by a 3-bit PDSCH-to-HARQ-timing-indicator field, if present, or by higher layers through Radio Resource Control (RRC) signaling.

If code block group (CBG) transmission is configured, a HARQ ACK/NACK for each CBG in a transport block (TB) is reported instead.

In case of carrier aggregation (CA) with multiple carriers and/or Time Division Duplex (TDD) operation, multiple aggregated HARQ ACK/HARQ NACK bits need to be sent in a single Physical Uplink Control Channel (PUCCH).

In NR, up to four PUCCH resource sets can be configured to a UE. A PUCCH resource set with pucch-ResourceSetId=0 can have up to 32 PUCCH resources while for PUCCH resource sets with pucch-ResourceSetId=1 to 3, each set can have up to 8 PUCCH resources. A UE determines the PUCCH resource set in a slot based on the number of aggregated UCI (Uplink Control Information) bits to be sent in the slot. The UCI bits consist of HARQ ACK/HARQ NACK, scheduling request (SR), and channel state information (CSI) bits.

If the UE transmits $O_{UCI}$ UCI information bits, the UE determines a PUCCH resource set to be a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occur simultaneously, or a second set of PUCCH resources with pucch-ResourceSetId=1, if provided by higher layers, if $2 < O_{UCI} \leq N_2$, or a third set of PUCCH resources with pucch-ResourceSetId==2, if provided by higher layers, if $N_2 < O_{UCI} \leq N_3$, or a fourth set of PUCCH resources with pucch-ResourceSetId==3, if provided by higher layers, if $N_3 < O_{UCI} \leq 1706$.

where $N_1 < N_2 < N_3$ are provided by higher layers.

For a PUCCH transmission with HARQ-ACK information, a UE determines a PUCCH resource after determining a PUCCH resource set. The PUCCH resource determination is based on a 3-bit PUCCH resource indicator (PRI) field in DCI format 1_0 or DCI format 1_1.

If more than one DCI format 1_0 or 1_1 are received in the case of Carrier Aggregation (CA) and/or TDD, the PUCCH resource determination is based on a PUCCH resource indicator (PRI) field in the last DCI format 1_0 or DCI format 1_1 among the multiple received DCI format 1_0 or DCI format 1_1 that the UE detects.

NR Rel-15 supports two types of HARQ codebooks, i.e., semi-static (type 1) and dynamic (type 2) codebooks, for HARQ ACK/HARQ NACK multiplexing for multiple PDSCHs of one or more component carriers (CCs). A UE can be configured to use either one of the codebooks for HARQ ACK/HARQ NACK feedback.

1. NR Type-1 HARQ-ACK Codebook Determination

HARQ codebook (CB) size in time (DL association set) is determined based on the configured set of HARQ-ACK timings K1, and semi-static configured TDD pattern in case of TDD. For a Physical Downlink Control Channel (PDCCH) received in slot n for a PDSCH, K1 is signaled in the PDCCH and indicates that the HARQ ACK/HARQ NACK feedback for the PDSCH occurs in slot n+K1.

FIG. 2 illustrates an example of a Type 1 HARQ codebook for a TDD pattern with a set of K1 from 1 to 5 and a configured time-domain resource allocation table or the pdsch-TimeDomainAllocationList without non-overlapping PDSCH TDRA allocation, i.e., only one PDSCH can be scheduled in a slot. In this case, there are 5 entries in the HARQ codebook, one for each K1 value. For slots without PDSCH transmission or for slots where there is no PDSCH detected, the corresponding entry in the codebook is filled with NACK.

If UE supports reception of more than one unicast PDSCH per slot, one HARQ codebook entry for each non-overlapping time-domain resource allocation in the pdsch-symbolAllocation table is reserved per slot; otherwise one HARQ entry is reserved per slot.

2. NR Type-2 HARQ-ACK Codebook Determination

Unlike Type 1 HARQ codebook, the size of type 2 HARQ codebook changes dynamically based on the number of DCIs scheduling PDSCH receptions or Semi Persistent Scheduling (SPS) PDSCH release that are associated with a same PUCCH resource for HARQ ACK/HARQ NACK feedback. The number of DCIs can be derived based a counter Downlink Assignment Indicator (DAI) field in the DCIs and in case of DCI format 1-1, also a total DAI field if more than one serving cell are configured.

A value of the counter DAI field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion.

The value of the total DAI, when present, in DCI format 1_1 denotes the total number of {serving cell, PDCCH monitoring occasion}-pair(s) in which PDSCH reception(s) or SPS PDSCH release associated with DCI format 1_0 or DCI format 1_1 is present, up to the current PDCCH monitoring occasion m and is updated from PDCCH monitoring occasion to PDCCH monitoring occasion.

FIG. 3 illustrates an example DAI allocation. As shown, a UE is configured with 2 serving cells and 4 PDCCH monitoring occasions. Each scheduled DCI is shown via a filled box, and the corresponding counter DAI and total DAI values after each scheduled DCI are denoted as (counter DAI, total DAI). The counter DAI is updated after every scheduled DCI while total DAI is only updated every monitoring occasion. Since only 2 bits are allocated for either counter DAI or total DAI in DCI, the actual DAI values are wrapped round with a modulo 4 operation. A UE can figure out the actual number of DCIS transmitted even though some DCIS are undetected, if the undetected consecutive DCIS are smaller than 4.

For DCI format 1-1, the DAI field is only present when the Type-2 HARQ-ACK is used and bitwidths of 0, 2, or 4 bits are possible. For DCI format 1-0, the DAI field is composed of 2 bits.

The DAI field may be present in DCI format 0_1 for handling of HARQ codebooks in case of UCI transmitted on PUSCH.

First DAI: 1 bit for Type-1 HARQ-ACK codebook and 2 bits for Type-2 HARQ-ACK codebook.

Second DAI: 2 bits for Type-2 HARQ-ACK codebook with two HARQ-ACK sub-codebooks; 0 bit otherwise.

3. NR Type-3 HARQ-ACK Codebook Determination

The size of the codebook for NR Type-3 HARQ-ACK is fixed and is determined by the total number of HARQ processes and the number of configured cells. This codebook is used to provide feedback if the UE is configured with pdsch-HARQ-ACK-OneShotFeedback-r16 by higher layers via RRC signaling. The purpose of the Type-3 HARQ-ACK codebook is to be able to provide feedback in one shot for all HARQ processes across all activated cells.

The feedback can be requested in DL DCI format 1_1. In response to the trigger, the UE reports the HARQ-ACK feedback for all DL HARQ processes. The format of the feedback, either CBG-based HARQ-ACK or TB-based HARQ-ACK, can be configured to be part of the one-shot HARQ feedback for the component carriers.

Additionally, to resolve any possible ambiguity between the gNB and the UE that might be caused by possible mis-detection of PDCCH(s), the UE can be configured to report the corresponding latest New Data Indicator (NDI) value for a latest received PDSCH for that HARQ process along with the corresponding HARQ-ACK for the received PDSCH. From gNB perspective, if the NDI value matches the last transmitted value, it indicates that the reported HARQ-ACK feedback correctly corresponds to the HARQ process with pending feedback. Otherwise, the mismatch suggests that the UE is reporting an outdated feedback.

4. Prior Enhancements for NTN

Certain previously proposed enhancements to HARQ feedback procedures for NTNs focused on handling of disabled processes for Type-2 HARQ-ACK codebook. The enhancements proposed not including information corresponding to HARQ processes that are disabled in the Type-2 codebook and including not incrementing the downlink assignment index values for such HARQ processes. The true DAI values can be transmitted in the DAI field when a disabled HARQ process is scheduled or the DAI field can be reserved. The enhancements also included the possibility of not including the DAI field in the DCI.

The enhancements further allowed disabled HARQ processes in the Type-1 HARQ codebook to be set to NACKs.

Additionally, with the UE being configured with both feedback disabled HARQ processes and feedback enabled HARQ processes, UE procedures related to Type-3 HARQ codebook is still undefined. Furthermore, the efficient use of Type-3 codebook along with a Type 1 or a Type 2 codebook and with other features such as the use of DCI format 1_2 or the indication of non-numerical values for the delay between a DCI scheduling PDSCH on the downlink and the HARQ feedback on the uplink have not been addressed.

SUMMARY

Certain aspects of the present disclosure and their embodiments may provide solutions to these or other challenges. For example, according to certain embodiments, methods and systems are provided that define Type-3 HARQ codebook construction for a UE which is configured with feedback disabled HARQ processes.

According to certain embodiments, a method by a wireless device includes receiving, from a network node, configuration information that enables HARQ ACK and/or HARQ NACK feedback on a per HARQ basis for a first set of HARQ processes. Each of the first set of HARQ processes is identified by a respective one of a first set of HARQ process numbers, and wherein the configuration. The configuration information also disables HARQ ACK and/or HARQ NACK feedback on a per HARQ process basis for a second set of HARQ processes. Each of the second set of HARQ processes is identified by a respective one of a second set of HARQ process numbers. The wireless device constructs a first HARQ codebook of a first type based on the first set of HARQ process numbers for first set of HARQ processes for which HARQ ACK and/or HARQ NACK feedback is enabled and sends, to the network node, the HARQ ACK and/or HARQ NACK feedback based on the first HARQ codebook.

According to certain embodiments, a wireless device is adapted to receive, from a network node, configuration information that enables HARQ ACK and/or HARQ NACK feedback on a per HARQ basis for a first set of HARQ processes. Each of the first set of HARQ processes is identified by a respective one of a first set of HARQ process numbers, and wherein the configuration. The configuration information also disables HARQ ACK and/or HARQ NACK feedback on a per HARQ process basis for a second set of HARQ processes. Each of the second set of HARQ processes is identified by a respective one of a second set of HARQ process numbers. The wireless device is adapted to construct a first HARQ codebook of a first type based on the first set of HARQ process numbers for first set of HARQ processes for which HARQ ACK and/or HARQ NACK feedback is enabled and send, to the network node, the HARQ ACK and/or HARQ NACK feedback based on the first HARQ codebook.

According to certain embodiments, a method by a network node includes transmitting, to a wireless device, configuration information that enables HARQ ACK and/or HARQ NACK feedback on a per HARQ basis for a first set of HARQ processes. Each of the first set of HARQ processes is identified by a respective one of a first set of HARQ process numbers, and wherein the configuration. The configuration information also disables HARQ ACK and/or HARQ NACK feedback, on a per HARQ process basis, for a second set of HARQ processes. Each of the second set of HARQ processes is identified by a respective one of a second set of HARQ process numbers. The network node receives, from the wireless device, the HARQ ACK and/or HARQ NACK feedback based on a first HARQ codebook. The first HARQ codebook is of a first type, and the first HARQ codebook is constructed based on the first set of HARQ process numbers for the first set of HARQ processes for which HARQ ACK and/or HARQ NACK feedback is enabled.

According to certain embodiments, a network node is adapted to transmit, to a wireless device, configuration information that enables HARQ ACK and/or HARQ NACK feedback on a per HARQ basis for a first set of HARQ processes. Each of the first set of HARQ processes is identified by a respective one of a first set of HARQ process numbers, and wherein the configuration. The configuration information also disables HARQ ACK and/or HARQ NACK feedback, on a per HARQ process basis, for a second set of HARQ processes. Each of the second set of HARQ processes is identified by a respective one of a second set of HARQ process numbers. The network node is adapted to receive, from the wireless device, the HARQ ACK and/or HARQ NACK feedback based on a first HARQ codebook. The first HARQ codebook is of a first type, and the first HARQ codebook is constructed based on the first set of HARQ process numbers for the first set of HARQ processes for which HARQ ACK and/or HARQ NACK feedback is enabled.

Certain embodiments may provide one or more of the following technical advantages. For example, one technical advantage may be that certain embodiments define the UE procedures with regards to type 3 HARQ Codebook for the case when a UE is configured with both feedback disabled HARQ processes which are currently not known in the state of the art. As another example, a technical advantage may be that certain embodiments reduce the HARQ feedback overhead as the codebook size only takes into account PDSCHs associated with a feedback-enabled HARQ process.

Still another technical advantage may be that certain embodiments provide methods on the use of non-numerical values of K1 and on DCI overhead reduction to efficiently handle HARQ feedback for feedback disabled HARQ processes.

Still another technical advantage may be that certain embodiments decouple operation between enabled and disabled HARQ processes by using DCI formats 0_0/0_1 and 1_0/1_1 and corresponding configurations for operation using enabled HARQ processes and DCI formats 0_2/1_2 with corresponding configurations for operation using disabled HARQ processes.

Other advantages may be readily apparent to one having skill in the art. Certain embodiments may have one, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 illustrates an example DAI allocation;

DETAILED DESCRIPTION

Figure 1:
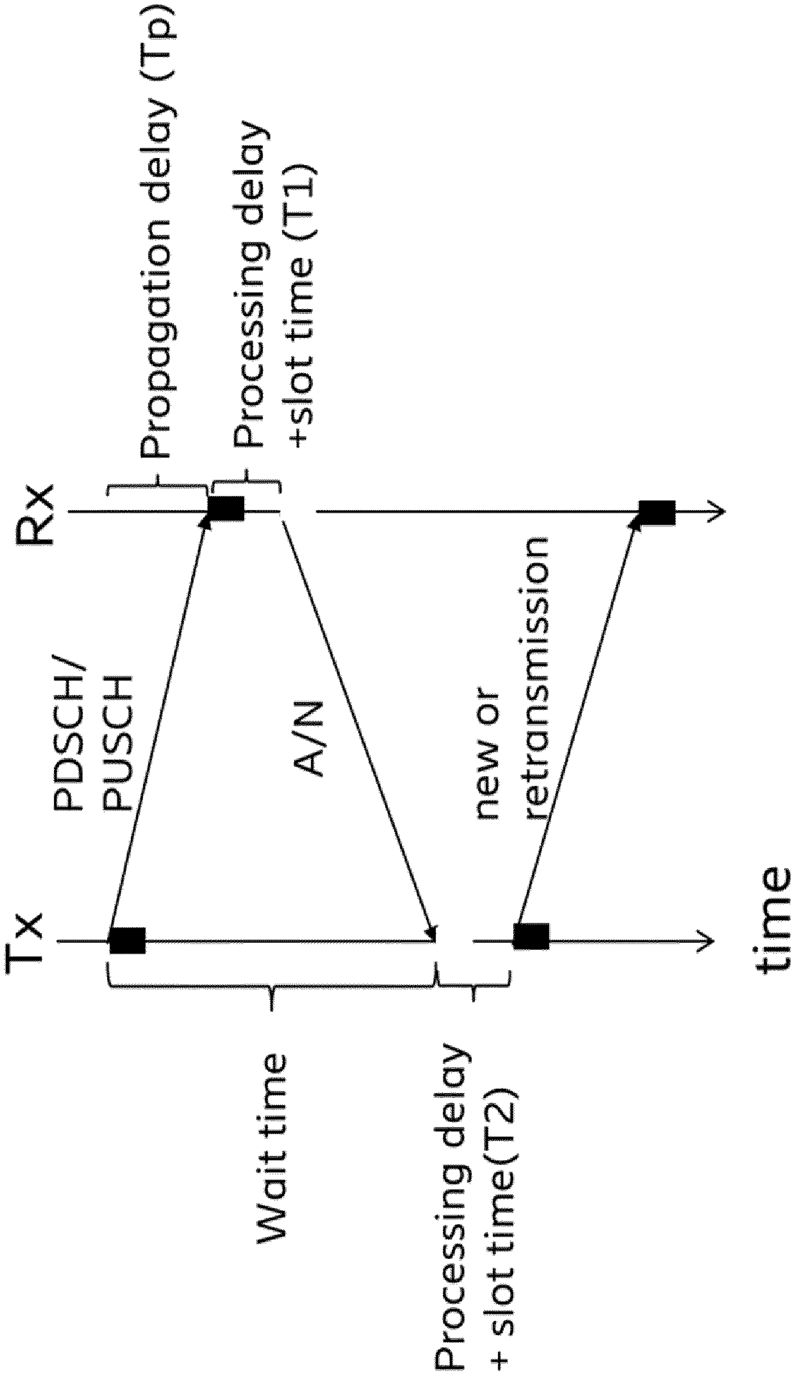
FIG. 1 illustrates HARQ protocol.
Figure 2:
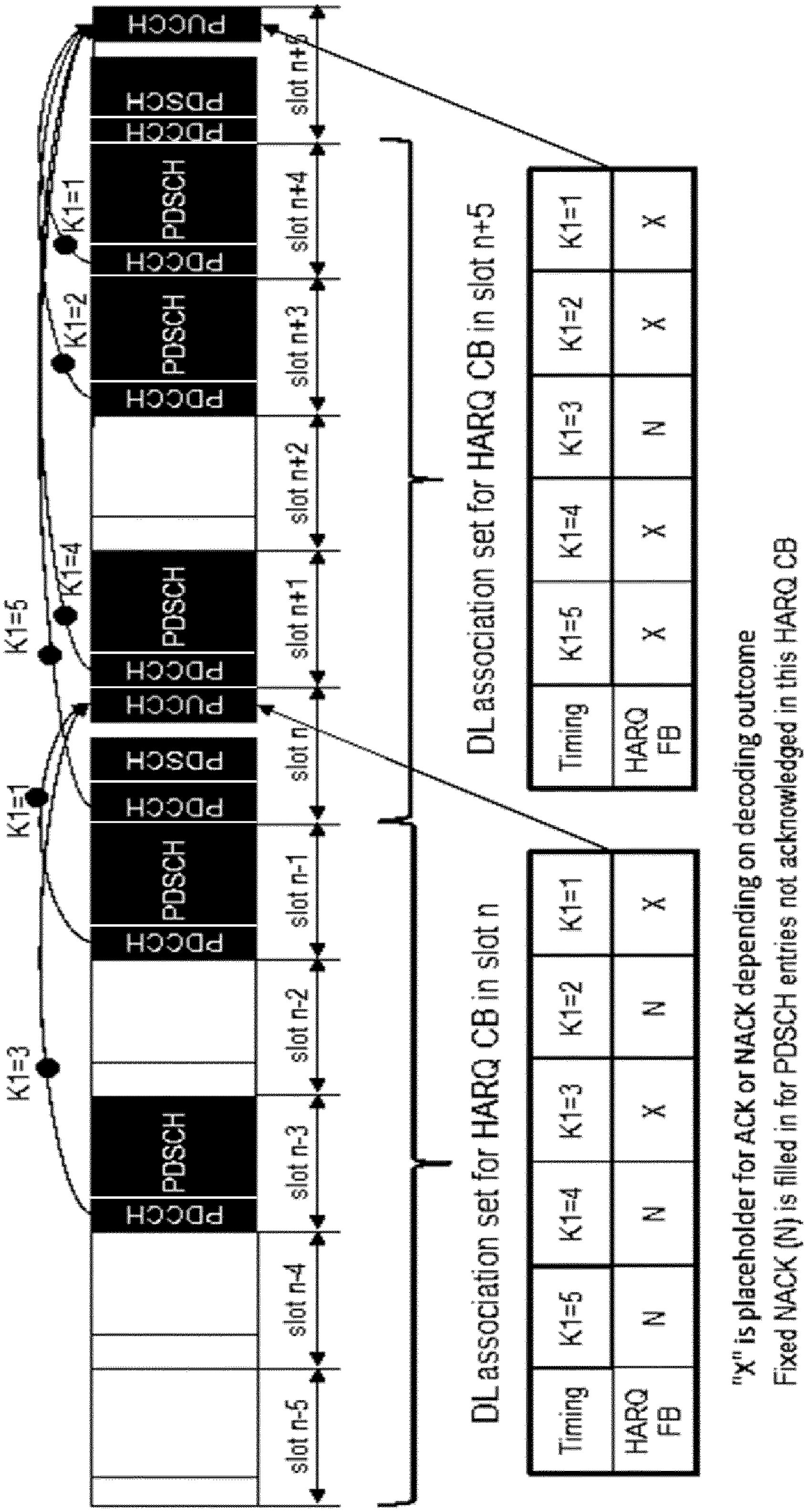
FIG. 2 illustrates an example of a Type 1 HARQ codebook for an example TDD pattern.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master NodeB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self Organizing Network (SON), positioning node (e.g. Evolved-Serving Mobile Location Centre (E-SMLC)), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-Vehicle UE (V2V UE), Vehicle-to-Anything (V2X UE), etc.

Additionally, terminologies such as base station/gNB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

In the below embodiments, the term K1 is sometimes used to represent the PDSCH-to-HARQ_feedback timing indicator and the terms "non-numerical" and "inapplicable" are used interchangeably to represent a value of K1 that is not to be used by the UE.

According to certain embodiments, the methods, systems, and techniques disclosed herein may include some or all of the following features:

- The type 3 HARQ codebook construction is dependent on whether the UE is scheduled with a PDSCH that is associated with a feedback-enabled HARQ process or not.
- The codebook is dimensioned to only include HARQ processes for which feedback is enabled in order to save overhead.

According to certain embodiments, the methods, systems, and techniques may use non-numerical values of K1 to efficiently handle HARQ feedback for both feedback enabled and feedback disabled HARQ processes.

- The indication of non-numerical values of K1 can be used to dynamically enable or disable HARQ processes when used in conjunction with a Type 1 HARQ codebook.

According to certain embodiments, the methods, systems, and techniques may provide a novel use of existing functionality to reduce DCI overhead:

- DCI format 0_2/1_2 can be used for exclusively scheduling HARQ processes that are disabled.
- The HARQ process number, DAI and RV fields can be excluded by appropriate configuration of parameters in the DCI message.
- The TDRA table for DCI format 2_1 can be used for scheduling PDSCHs using disabled HARQ processes.

Type 3 HARQ Codebook Handling for Disabled Processes

Since the Type-3 HARQ codebook includes feedback for all HARQ processes, the size of part of the HARQ codebook that is occupied by HARQ processes that are enabled and the size of the part of the codebook that is occupied by HARQ processes that are disabled is known to the UE based on configuration information from higher layers. Considering that there is no information that needs to be sent for the disabled HARQ processes, certain embodiments propose that the Type-3 HARQ codebook only includes feedback for HARQ processes that are enabled. In many scenarios where NTNs may operate with very few HARQ processes enabled, this can result in a significant reduction of overhead when Type-3 HARQ codebook is used.

An example showing changes to the pseudo-code that may achieve the features and operations per this embodiment are given below:

---

Set $N_{cells}^{DL}$ to the number of configured serving cells

Set $N_{HARQ,c}^{DL}$ to the value of nrofHARQ-ProcessesForPDSCH for serving cell c, if provided; else, set $N_{HARQ,c}^{DL} = 8$ Set $N_{TB,c}^{DL}$ to the value of maxNrofCodeWordsScheduledByDCI for serving cell c if harq-ACK-SpatialBundlingPUCCH is provided and $NDI_{HARQ} = 0$, or if harq-ACK-SpatialBundlingPUCCH is not provided, or if maxCodeBlockGroupsPerTransportBlock is provided for serving cell c; else, set $N_{TB,c}^{DL} = 1$ Set $N_{HARQ-ACK,c}^{CBG/TB,max}$ to the number of HARQ-ACK information bits per TB for PDSCH receptions on serving cell c as described in Clause 9.1.1 if maxCodeBlockGroupsPerTransportBlock is provided for serving cell c and pdsch-HARQ-ACK-OneShotFeedbackCBG-r16 is provided; else, set $N_{HARQ-ACK,c}^{CBG/TB,max} = 0$ Set $NDI_{HARQ} = 0$ if pdsch-HARQ-ACK-OneShotFeedbackNDI-r16 is provided; else set $NDI_{HARQ} = 1$ Set $enabledHARQ_{h,c} = 1$ if feedback for HARQ process number h on serving cell c is enabled, else set $enabledHARQ_{h,c} = 0$. [the parameter -continued

```
name enabledHARQ is a non-limiting example name]
Set c = 0 – serving cell index
Set h = 0 – HARQ process number
Set t = 0 – TB index
Set g = 0 – CBG index
Set j = 0
  while c < $N_{cells}^{DL}$
    while h < $N_{HARQ,c}^{DL}$
      if enabledHARQ$_{h,c}$ = 1
        if NDI$_{HARQ}$ = 0
          if $N_{HARQ-ACK,c}^{CBG/TB,max}$ > 0
            while t < $N_{TB,c}^{DL}$
              while g < $N_{HARQ-ACK,c}^{CBG/TB,max}$
                $\tilde{o}_j^{ACK}$ = HARQ-ACK information bit for CBG g
                of TB t for HARQ process number h of
                serving cell c
                j = j + 1
                g = g + 1
              end while
              $\tilde{o}_j^{ACK}$ = NDI value indicated in the DCI format
              corresponding to the HARQ-ACK information
              bit(s) for TB t for HARQ process number h on
              serving cell c, if any; else, $\tilde{o}_j^{ACK}$ = 0
              g = 0
              j = j + 1
              t = t + 1
            end while
          else
            while t < $N_{TB,c}^{DL}$
              $\tilde{o}_j^{ACK}$ = HARQ-ACK information bit for TB t for
              HARQ process h of serving cell c
              j = j + 1
              $\tilde{o}_j^{ACK}$ = NDI value indicated in the DCI format
              corresponding to the HARQ-ACK information
              bit(s) for TB t for HARQ process number h on
              serving cell c, if any; else, $\tilde{o}_j^{ACK}$ = 0
              j = j + 1
              t = t + 1
            end while
          end if
          t = 0
        else
          if $N_{HARQ-ACK,c}^{CBG/TB,max}$ > 0
            while t < $N_{TB,c}^{DL}$
              if UE has reported HARQ-ACK information for
              TB t for HARQ process number h on serving
              cell c, and has not subsequently detected a DCI
              format scheduling a PDSCH reception, or
              received a SPS PDSCH, with TB t for HARQ
              process number h on serving cell c
                while g < $N_{HARQ-ACK,c}^{CBG/TB,max}$
                  $\tilde{o}_j^{ACK}$ = NACK
                  j = j + 1
                  g = g + 1
                end while
              end if
              if UE has obtained HARQ-ACK information for
              TB t for HARQ process number h on serving
              cell c corresponding to a PDSCH reception and
              has not reported the HARQ-ACK information
              corresponding to the PDSCH reception
                while g < $N_{HARQ-ACK,c}^{CBG/TB,max}$
                  $\tilde{o}_j^{ACK}$ = HARQ-ACK information bit for CBG
                  g of TB t for HARQ process number h of
                  serving cell c
                  j = j + 1
                  g = g + 1
                end while
              end if
              g = 0
              t = t + 1
            end while
          else
            while t < $N_{TB,c}^{DL}$
              if UE has reported HARQ-ACK information for
              TB t for HARQ process number h on serving
              cell c and has not subsequently detected a DCI
              format scheduling a PDSCH reception, or
              received a SPS PDSCH, with TB t for HARQ
              process number h on serving cell c
                $\tilde{o}_j^{ACK}$ = NACK
                j = j + 1
                t = t + 1
              end if
              if UE has obtained HARQ-ACK information for
              TB t for HARQ process number h on serving
              cell c corresponding to a PDSCH reception and
              has not reported the HARQ-ACK information
              corresponding to the PDSCH reception
                if harq-ACK-SpatialBundlingPUCCH is not
                provided
                $\tilde{o}_j^{ACK}$ = HARQ-ACK information bit for TB t for
                HARQ process h of serving cell c
                else
                $\tilde{o}_j^{ACK}$ = binary AND operation of the HARQ-
                ACK information bits corresponding to first
                and second transport blocks for HARQ
                process h of serving cell c. If the UE receives
                one transport block, the UE assumes ACK for
                the second transport block
                end if
                j = j + 1
                t = t + 1
              end if
            end while
          end if
          t = 0
        end if
      end if
      h = h + 1
    end while
    h = 0
    c = c + 1
  end while
```

Operation of Type 3 HARQ Codebook Along with Type 1 Codebook

These embodiments may be useful when Type 3 HARQ codebook is intended for primary use. The Type 1 HARQ codebook is configured to be of very small size.

According to certain embodiments, for example, when scheduling enabled HARQ processes, a non-numerical K1 value is indicated in the DCI which causes the UE to discard the HARQ process. HARQ feedback is then obtained by triggering feedback for the Type 3 HARQ codebook later. By operating in this manner, HARQ feedback overhead can be minimized in situations where the network is operating with very few HARQ processes being enabled.

Operation of Type 1 HARQ Codebook

When operating a Type 1 HARQ codebook for NTN, a UE reports HARQ-ACK information for a corresponding PDSCH reception in a HARQ-ACK codebook that the UE transmits in a slot indicated by a value of a PDSCH-to-HARQ_feedback timing indicator only if the HARQ process corresponding to the PDSCH reception is enabled.

If the UE receives a DL DCI that indicates a HARQ process that is disabled, the UE may not generate a corresponding HARQ-ACK information for the PDSCH scheduled by the DCI. In other words, the PRI and K1 fields in the DCI are ignored. If the UE reports HARQ-ACK information for the PDSCH reception corresponding to a disabled HARQ, the UE sets a value for each corresponding HARQ-ACK information bit to NACK.

According to certain embodiments, if all of the HARQ processes corresponding to scheduled PDSCHs in the DL association set are disabled, then no Type 1 HARQ codebook is transmitted in the PUCCH resources corresponding to the DL association set. Since the gNB is aware of the HARQ processes that have been scheduled, the gNB does not expect the UE to transmit any HARQ codebook on PUCCH, i.e., there is no misalignment between the gNB and the UE.

Dynamic Disabling of HARQ Processes with the Use of Non-Numerical K1 Value with a Type 1 Codebook According to certain embodiments, HARQ processes that are enabled or disabled can be varied dynamically. This is different from the embodiments described above and is achieved, as in the previous embodiment, using the fact that the UE discards the HARQ feedback for which a non-numerical K1 value is received when configured with a Type 1 HARQ codebook, according to certain embodiments.

An exemplary example of such operation could be as follows. The UE operates with a Type 1 codebook with some fixed size as configured by higher layers. The UE may initially be configured with all HARQ processes being enabled. When scheduling PDSCH reception for the UE, if the network chooses to dynamically disable the HARQ process corresponding to the PDSCH being scheduled, the gNB can set the PDSCH-to-HARQ_feedback timing indicator value in the DCI to an inapplicable value (−1) from the values configured in dl-DataToUL-ACK by higher layers. Since no timing information is provided for this HARQ process, the UE will discard the feedback information effectively disabling the HARQ process for this particular PDSCH reception.

Use of Non-Numerical K1 Value Along with DAI Values to Manage Feedback for HARQ Processes with Type 2 HARQ Codebook The reporting of the true DAI value in the DAI field when scheduled with a disabled HARQ process when operating with a Type-2 HARQ codebook has been proposed as an enhancement for NTN, as described above. However, there may be some ambiguity when all HARQ processes that are currently scheduled to a UE are disabled. The UE may not be able to distinguish whether the indicated DAI value reflects some DCI scheduling a PDSCH that was missed by the UE where the scheduled PDSCH corresponds to a HARQ process that was enabled, or whether the indicated DAI value is meaningless since no scheduling with enabled HARQ processes have any outstanding feedback to be reported. Therefore, according to certain embodiments, it may be necessary to be able to signal to the UE in some instances that the DAI value should be ignored. In a particular embodiment, this is achieved using the inapplicable value for the PDSCH-to-HARQ_feedback timing indicator (referred to as the non-numerical K1 value). That is, the DAI value is ignored when the UE is scheduled a PDSCH with a non-numerical K1 value and a disabled HARQ when operating with a Type 2 HARQ codebook.

Use of DCI Format 1_2 to Reduce DCI Overhead when Scheduling with Disabled HARQ Processes According to certain embodiments, DCI format 1_1 is used for enabled HARQ processes and DCI format 1_2 is used for disabled HARQ processes. In a particular embodiment, DAI and Redundancy version fields can be configured to have zero bits in DCI format 1_2 to save overhead. In a particular embodiment, the HARQ process number can also be set to zero by configuring the higher layer parameter, harq-ProcessNumberSizeForDCI-Format1-2, to 0 bits. Alternatively, the corresponding field can be kept in DCI to indicate the corresponding HARQ process number. The DAI field is set to zero bits by not configuring the higher layer parameter, downlinkAssignmentIndexForDCI-Format1-2. The Redundancy version is set to zero bits by configuring the higher layer parameter, numberOfBitsForRV-ForDCI-Format1-2, to be zero bits.

When a PDSCH is then scheduled using DCI format 1_2, the UE automatically assumes that Redundancy version of 0 is used and there is no feedback necessary for the PDSCH. Thus, existing functionality can be reused using a novel scheduling method where the enabled and disabled HARQ processes are used for scheduling with DCI formats 1_1 and 1_2 respectively, according to certain embodiments.

If the UE is configured with Type-2 HARQ-ACK codebook, by using DCI 1_2 for scheduling PDSCHs with disabled HARQ processes with a 0 bit DAI field, the UE will not generate any HARQ codebook for the PDSCHs corresponding to disabled HARQ processes following the Rel-16 procedures. By using DCI format 1_0/1_1 for PDSCHs using enabled HARQ processes, the corresponding CB would be generated and transmitted on the associated PUCCHs.

Use of DCI Format 1_2 to Reduce HARQ Feedback Overhead when Scheduling with Disabled HARQ Processes and Operating with a Type 1 HARQ Codebook According to certain embodiments, if the UE is configured with Type-1 HARQ-ACK codebook, pdsch-TimeDomainAllocationListForDCI-Format1-2 can be used for scheduling PDSCHs using disabled HARQ processes which can be excluded for semi-static (Type 1) HARQ codebook construction. In this sense, the Type-1 HARQ codebook would not carry overhead due to PDSCHs with disabled HARQ.

Figure 4:
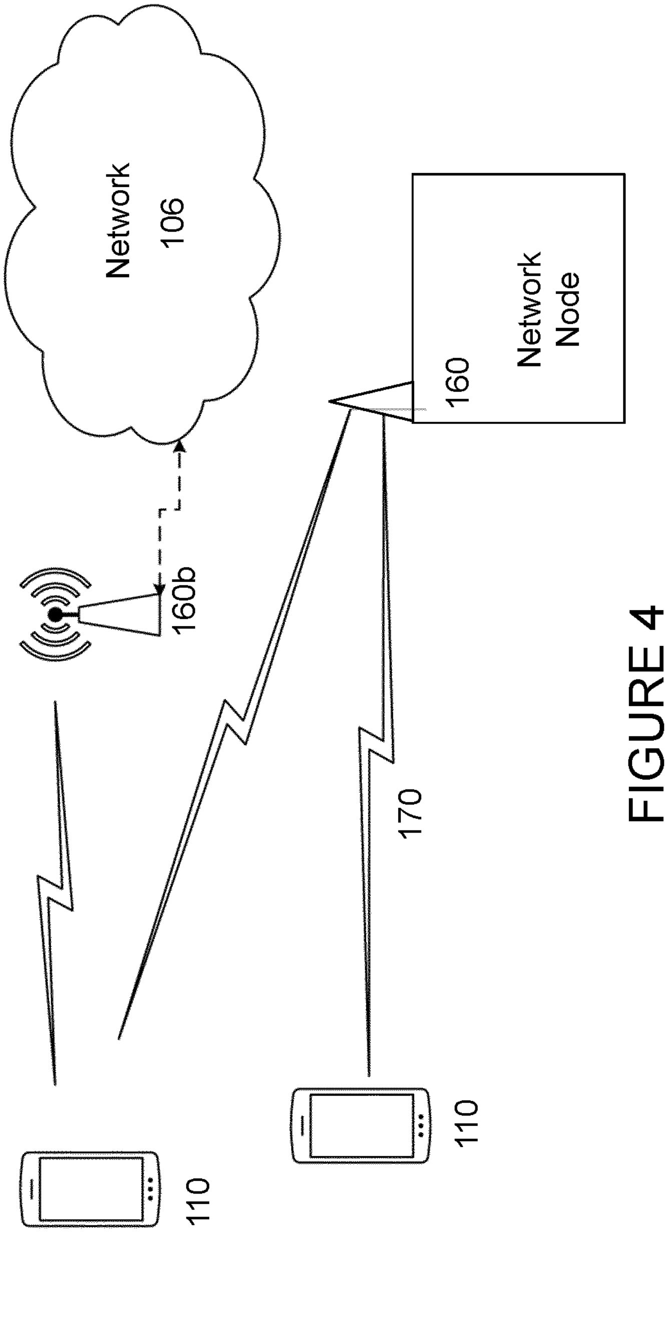
FIG. 4 illustrates an example wireless network, according to certain embodiments.

FIG. 4 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
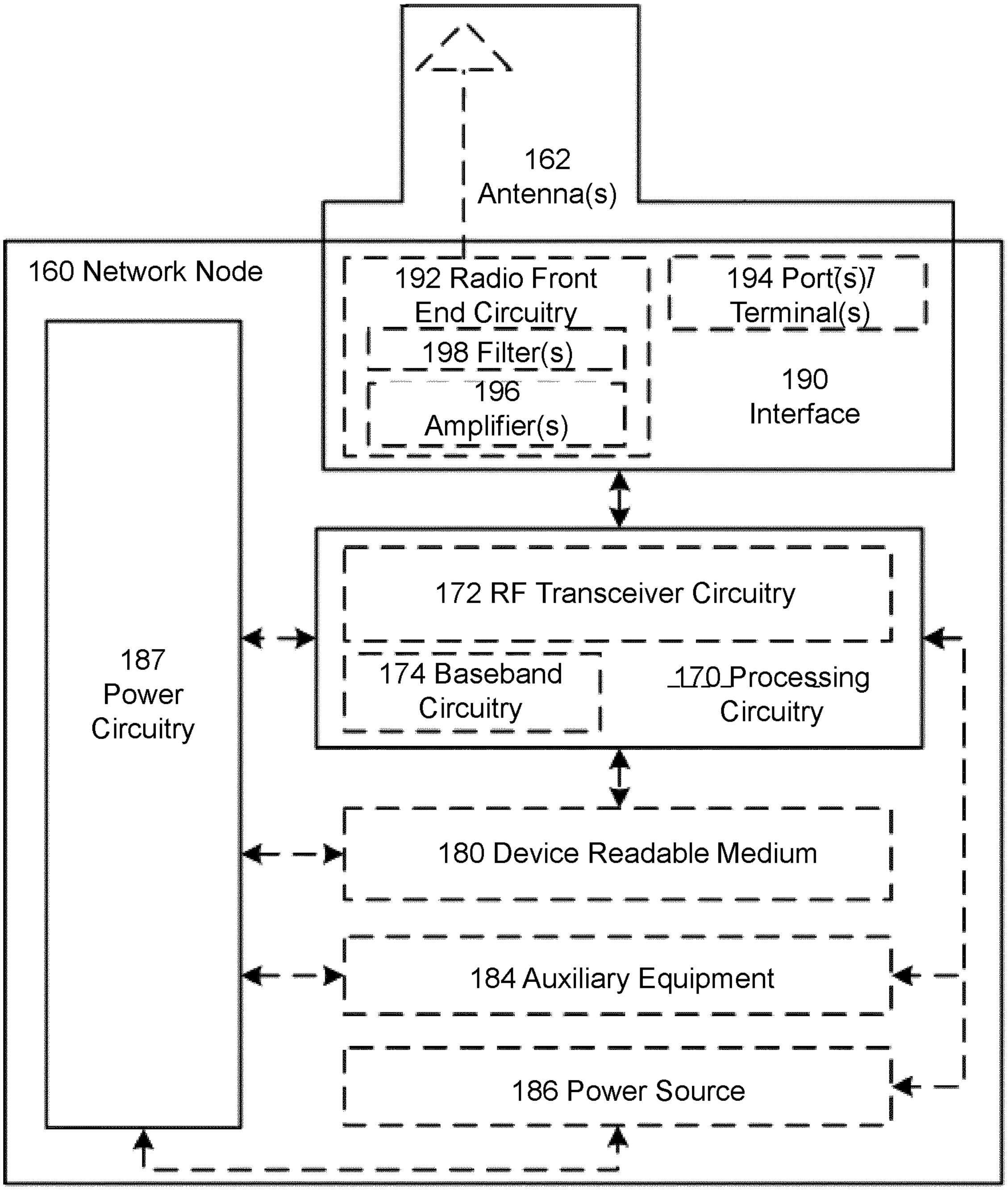
FIG. 5 illustrates an example network node, according to certain embodiments.

FIG. 5 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
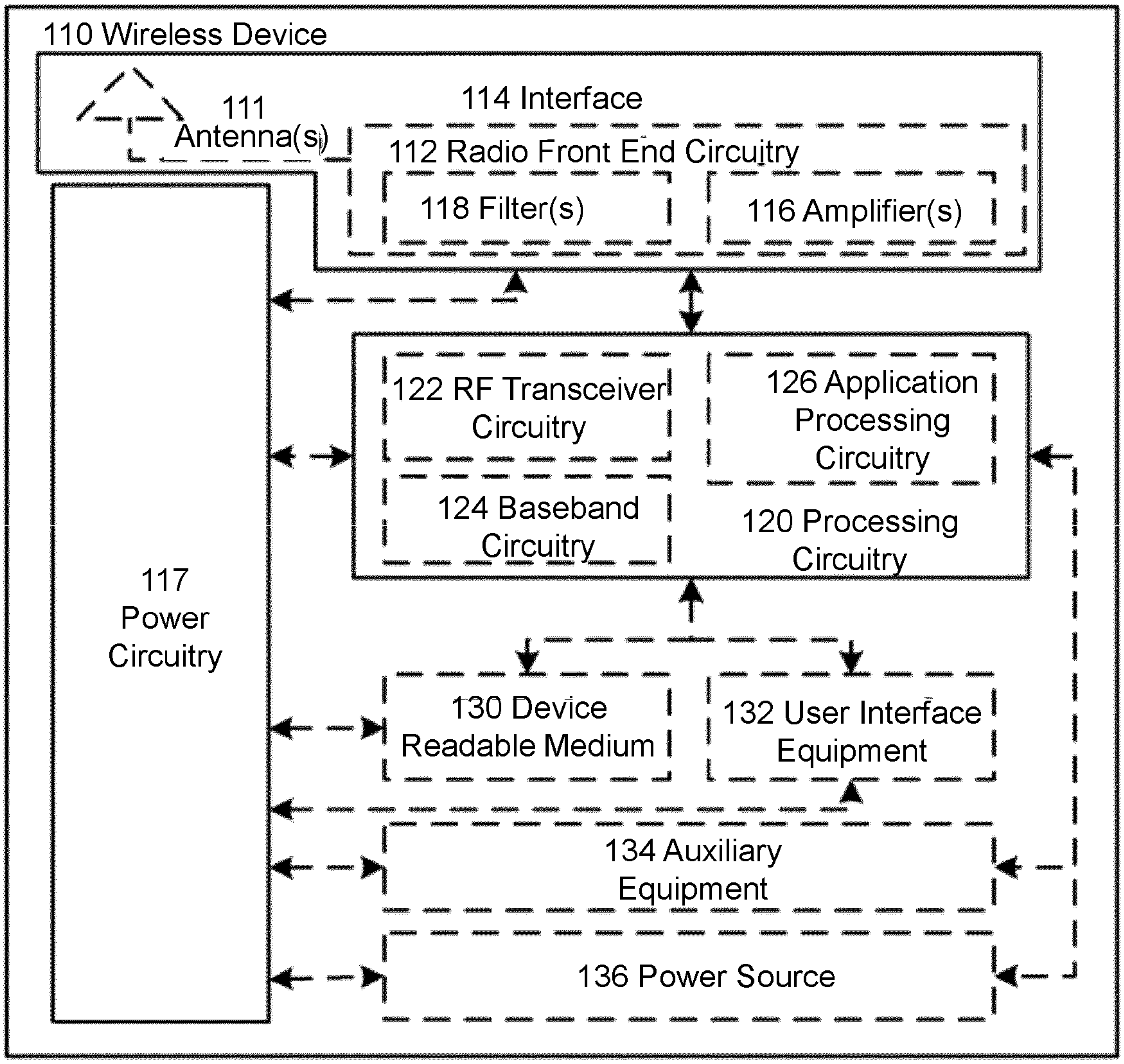
FIG. 6 illustrates an example wireless device, according to certain embodiments.

FIG. 6 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 7:
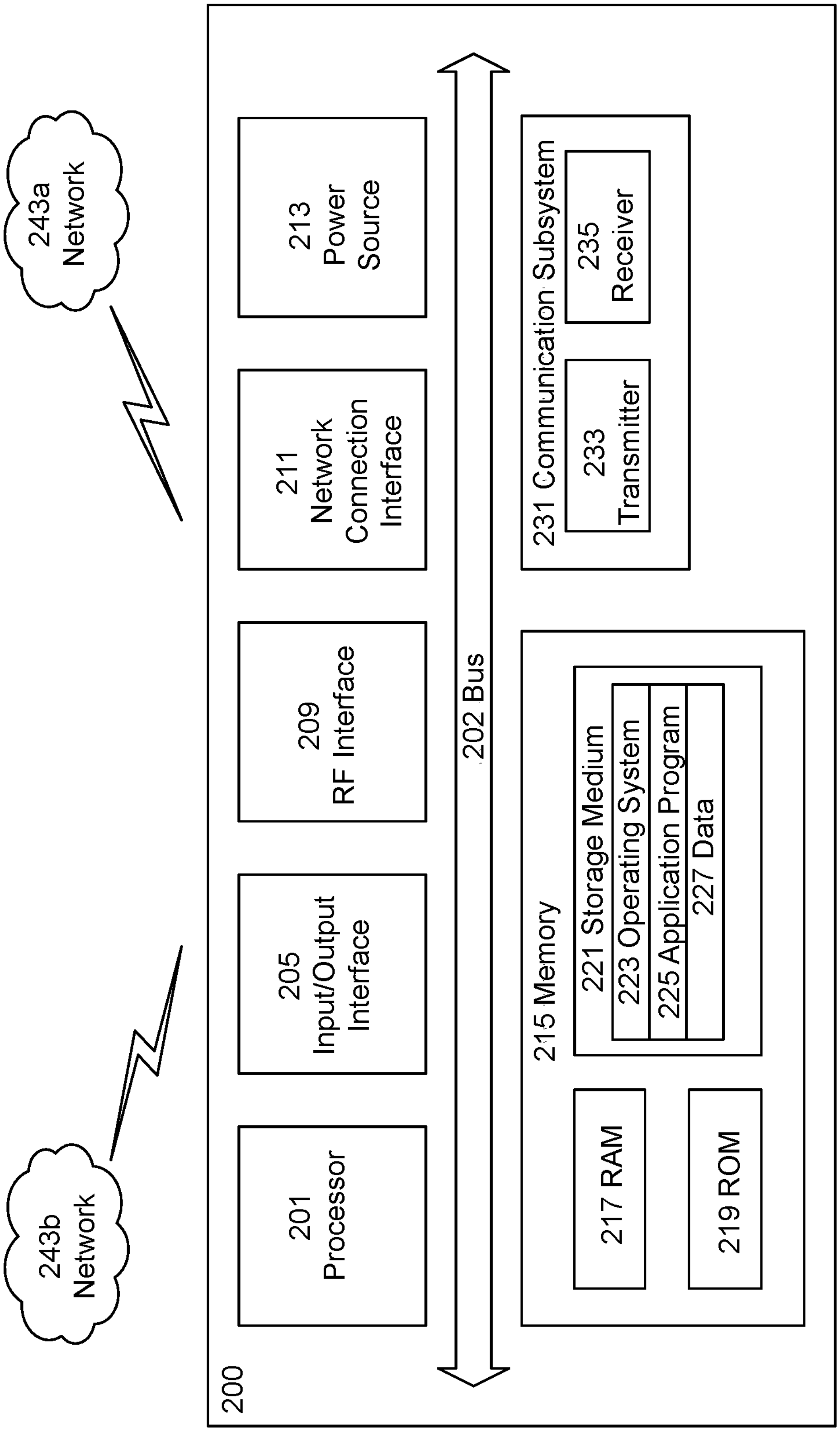
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 5, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 7 is a UE, the components discussed herein are equally applicable to a wireless device, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
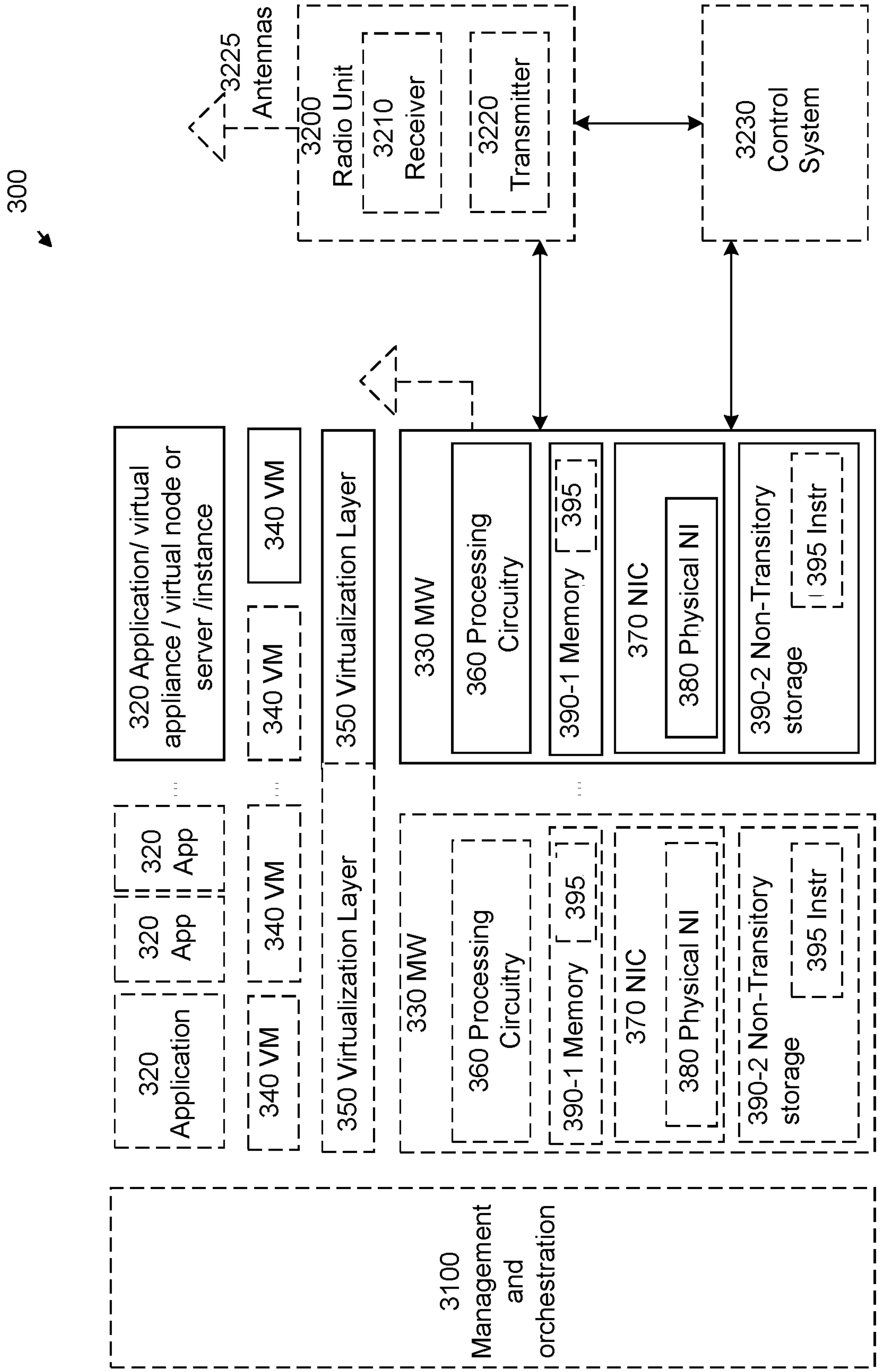
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware

330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 9:
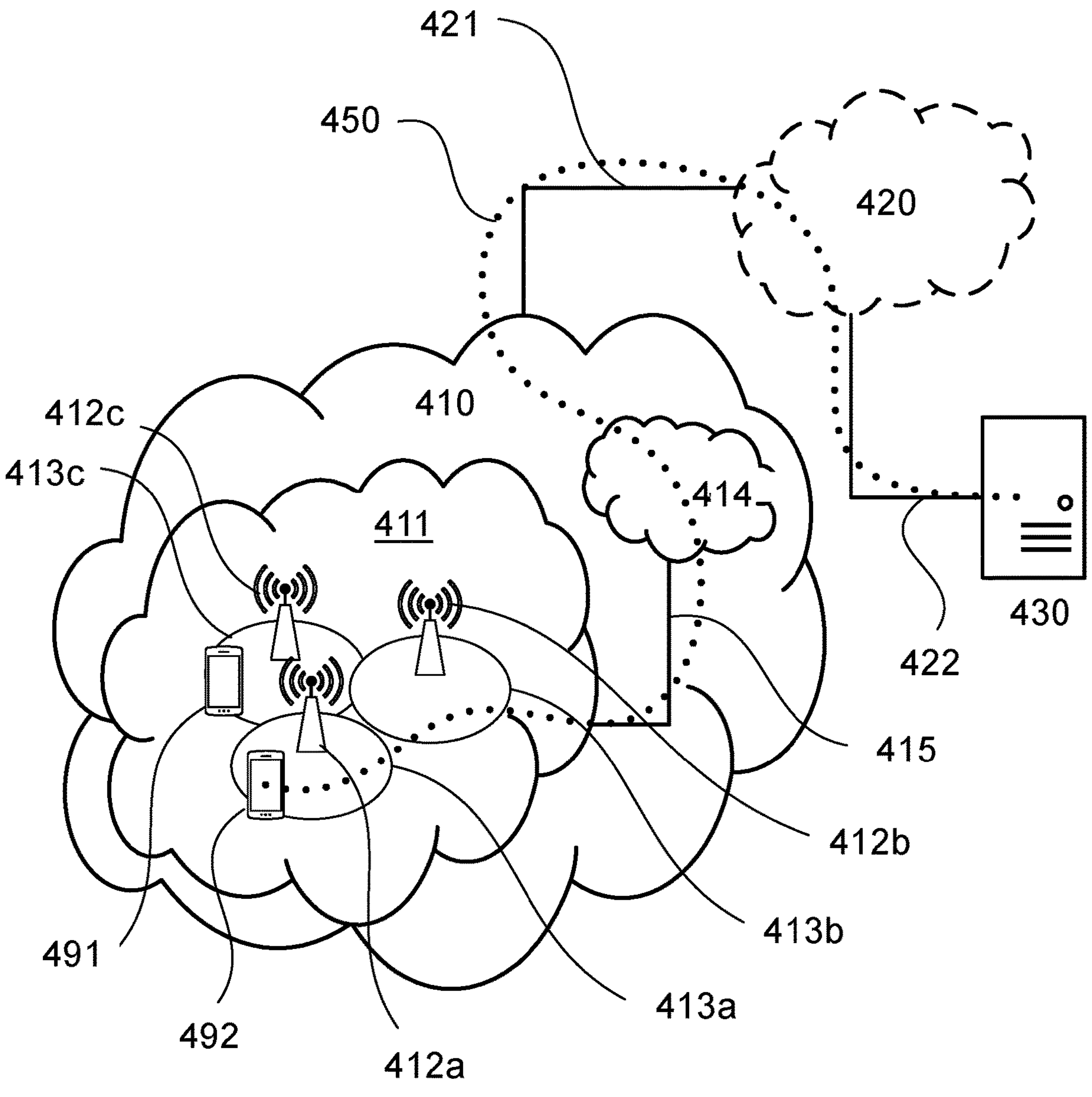
FIG. 9 illustrates a telecommunication network connected via an intermediate network to a host computer, according to certain embodiments.

FIG. 9 illustrates a telecommunication network connected via an intermediate network to a host computer in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
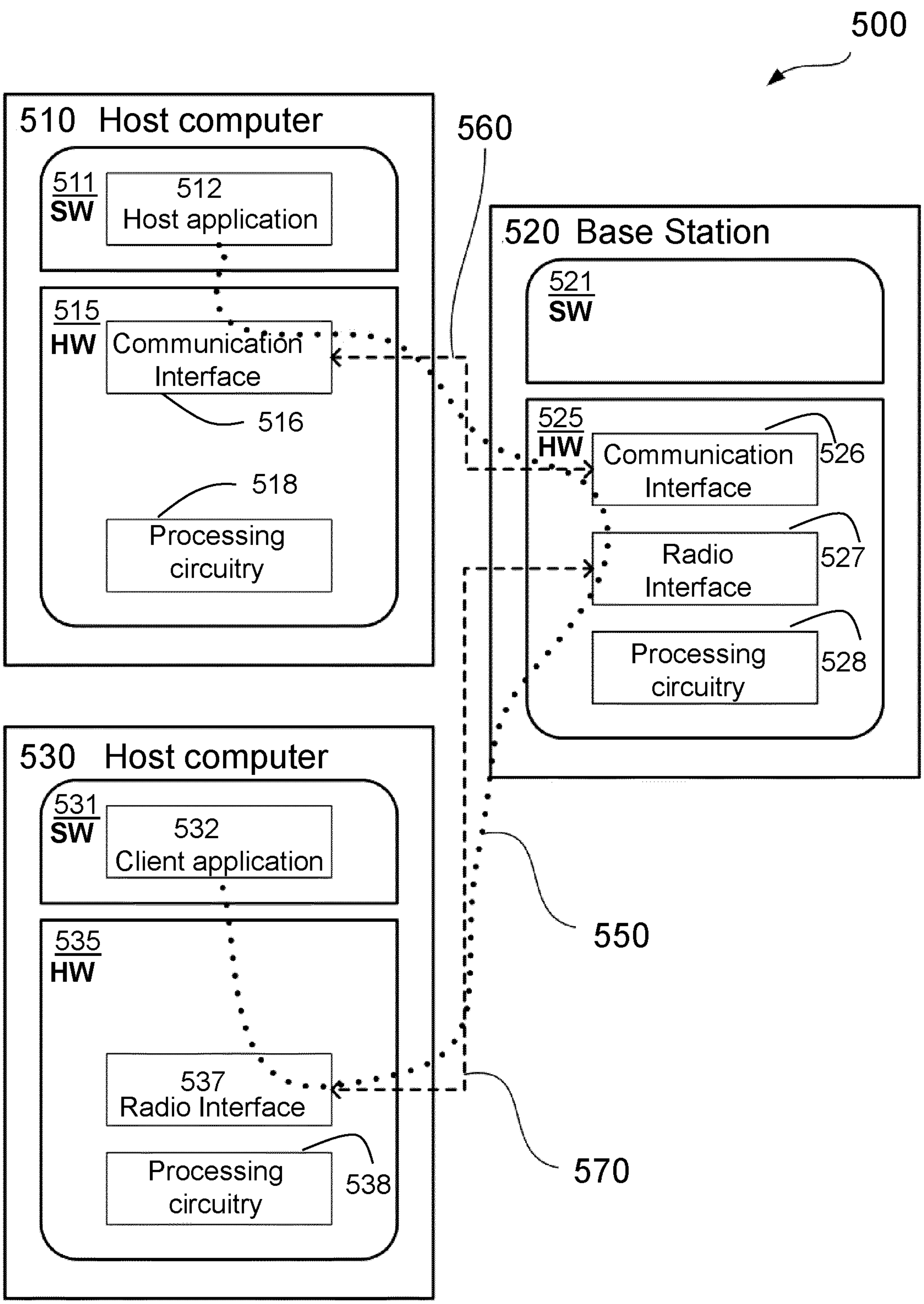
FIG. 10 illustrates a generalized block diagram of a host computer communicating via a base station with a user equipment over a partially wireless connection, according to certain embodiments.

FIG. 10 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
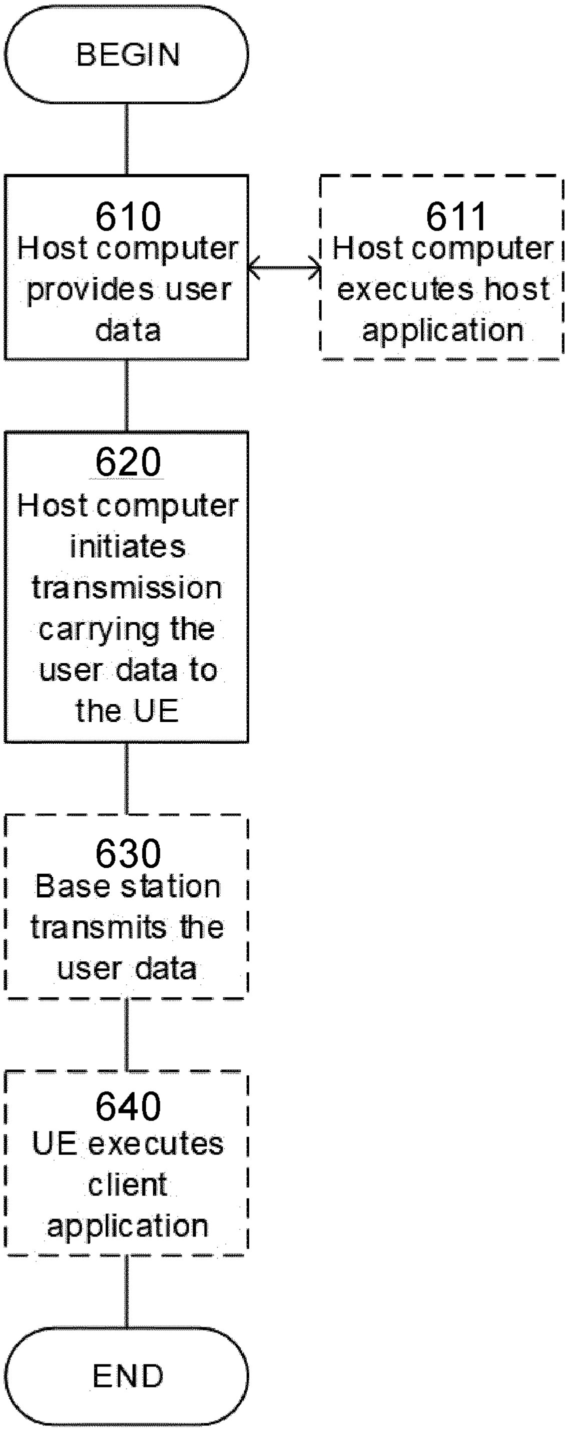
FIG. 11 illustrates a method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
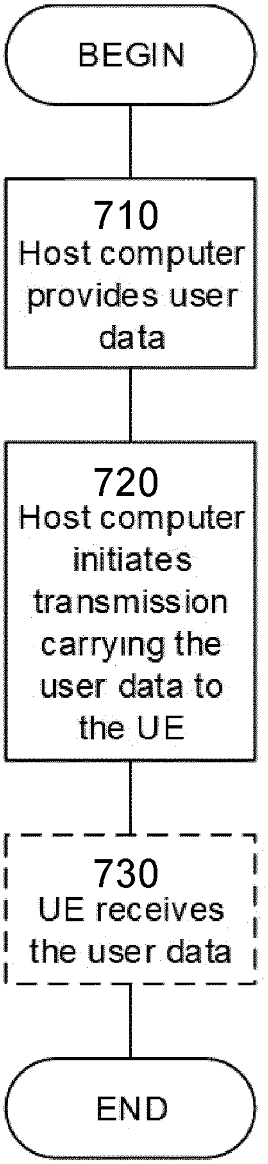
FIG. 12 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
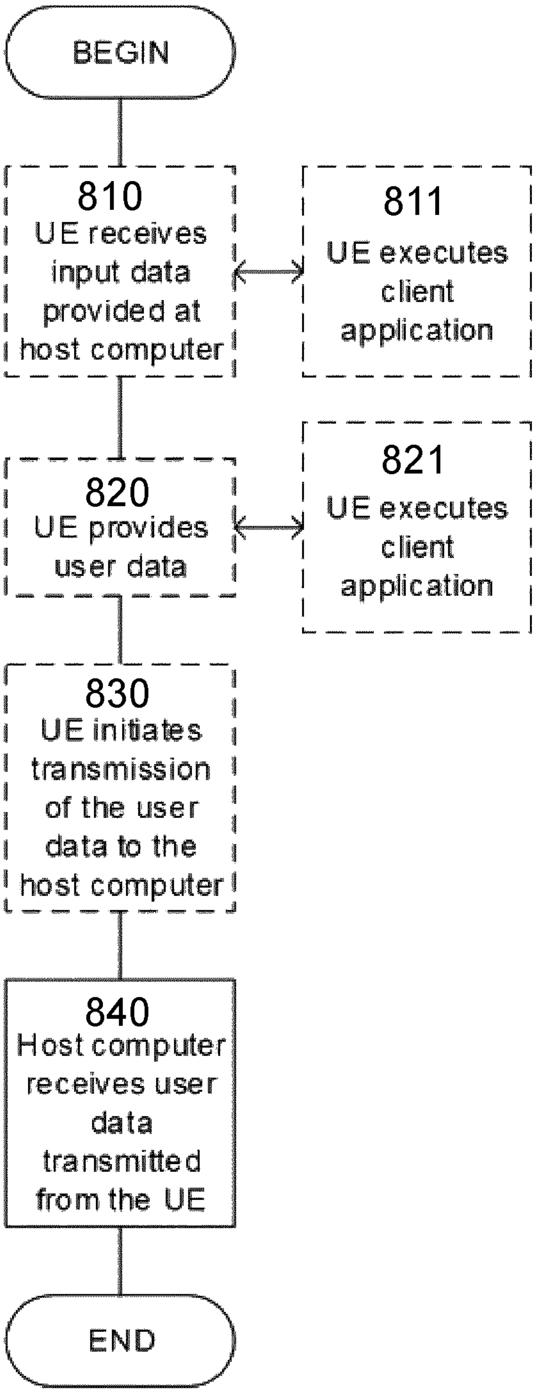
FIG. 13 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer.

Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
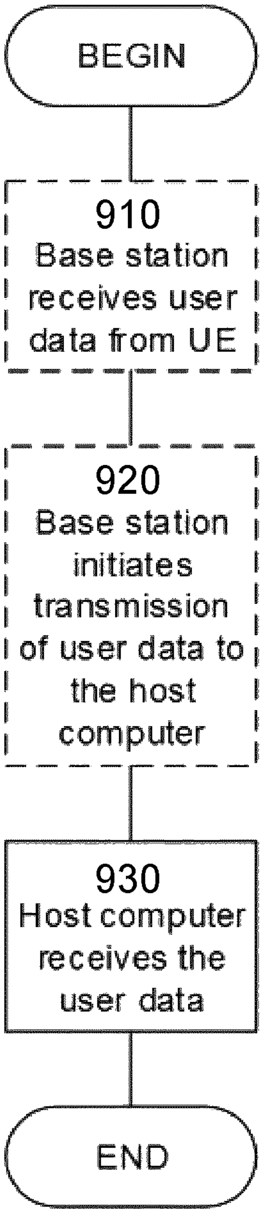
FIG. 14 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 15:
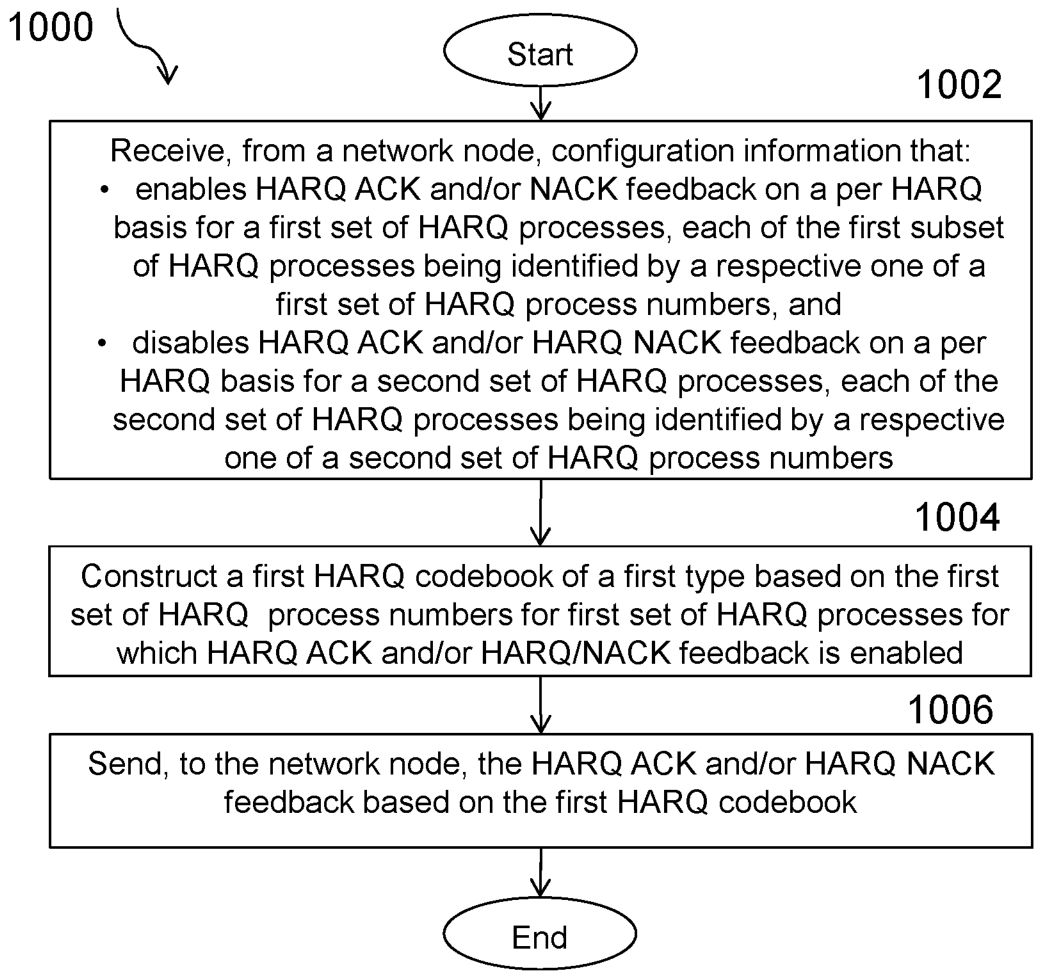
FIG. 15 illustrates an example method by a wireless device, according to certain embodiments.

FIG. 15 depicts a method 1000 by a wireless device 110, according to certain embodiments. At step 1002, the wireless device receives, from a network node 160, configuration information. The configuration information enables HARQ ACK and/or HARQ NACK feedback on a per HARQ basis for a first set of HARQ processes. Each of the first set of HARQ processes is identified by a respective one of a first set of HARQ process numbers. The configuration information also disables HARQ ACK and/or HARQ NACK feedback, on a per HARQ process basis, for a second set of HARQ processes. Each of the second set of HARQ processes being identified by a respective one of a second set of HARQ process numbers. At step 1004, the wireless device 110 constructs a first HARQ codebook of a first type based on the first set of HARQ process numbers for first set of HARQ processes for which HARQ ACK and/or HARQ NACK feedback is enabled. At step 1006, the wireless device 110 sends, to the network node 160, the HARQ ACK and/or HARQ NACK feedback based on the first HARQ codebook.

In a particular embodiment, the first HARQ codebook of the first type is not constructed based on the second set of HARQ processes for which HARQ ACK and/or HARQ NACK feedback is disabled.

In a particular embodiment, the first HARQ codebook comprises a TYPE 3 HARQ codebook, and wireless device 110 receives DCI that triggers Type 3 HARQ Feedback.

In a further particular embodiment, the TYPE 3 HARQ codebook is used along with a HARQ codebook of Type 1.

In a particular embodiment, a PDSCH reception corresponding to a particular HARQ process for which HARQ feedback is enabled is scheduled with an indication of an inapplicable value for the PDSCH-to-HARQ_feedback timing indicator field in the DCI triggering the HARQ ACK and/or HARQ NACK feedback. The HARQ ACK and/or HARQ NACK feedback for the particular HARQ process is subsequently obtained by triggering feedback for the Type 3 HARQ codebook.

In a particular embodiment, based on DCI triggering HARQ ACK and/or HARQ NACK feedback, the wireless device 110 determines a transmission resource for sending the HARQ ACK and/or HARQ NACK feedback. The HARQ ACK and/or HARQ NACK feedback is sent to the network node using the transmission resource.

In a further particular embodiment, the resource includes a PUCCH resource for sending the HARQ ACK and/or HARQ NACK feedback, and the PUCCH resource is determined based on a PUCCH resource indicator field in the DCI triggering the HARQ feedback.

Figure 16:
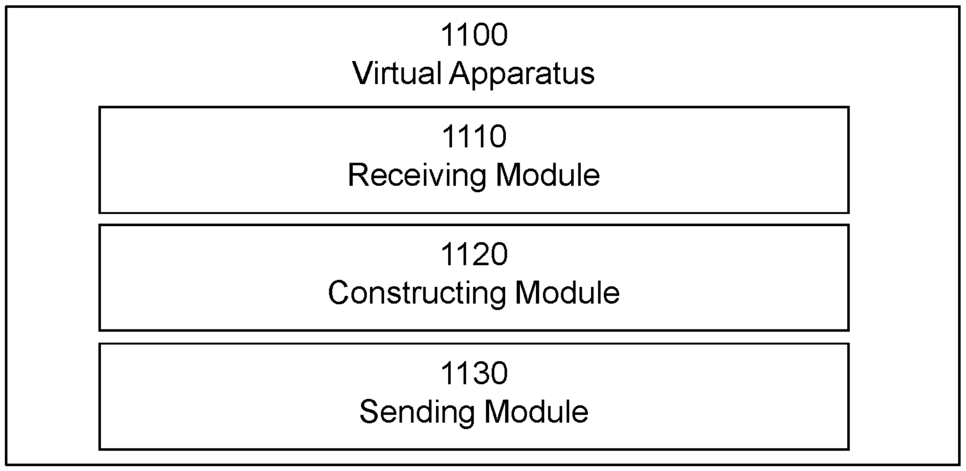
FIG. 16 illustrates an exemplary virtual computing device, according to certain embodiments.

FIG. 16 illustrates a schematic block diagram of a virtual apparatus 1100 in a wireless network (for example, the wireless network shown in FIG. 4). The apparatus may be implemented in a wireless device or network node (e.g., wireless device 110 or network node 160 shown in FIG. 4). Apparatus 1100 is operable to carry out the example method described with reference to FIG. 15 and possibly any other processes or methods disclosed herein. It is also to be understood that the method of FIG. 15 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, constructing module 1120, sending module 1130, and any other suitable units of apparatus 1100 to perform corresponding functions according one or more embodiments of the present disclosure.

According to certain embodiments, receiving module 1110 may perform certain of the receiving functions of the apparatus 1100. For example, receiving module 1110 may receive, from a network node 160, configuration information. The configuration information enables HARQ ACK and/or HARQ NACK feedback on a per HARQ basis for a first set of HARQ processes. Each of the first set of HARQ processes is identified by a respective one of a first set of HARQ process numbers. The configuration information also disables HARQ ACK and/or HARQ NACK feedback, on a per HARQ process basis, for a second set of HARQ processes. Each of the second set of HARQ processes being identified by a respective one of a second set of HARQ process numbers.

According to certain embodiments, constructing module 1120 may perform certain of the constructing functions of the apparatus 1100. For example, constructing module 1120 may construct a first HARQ codebook of a first type based on the first set of HARQ process numbers for first set of HARQ processes for which HARQ ACK and/or HARQ NACK feedback is enabled.

According to certain embodiments, sending module 1130 may perform certain of the sending functions of the apparatus 1100. For example, sending module 1130 may send, to the network node, the HARQ ACK and/or HARQ NACK feedback based on the first HARQ codebook.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 17:
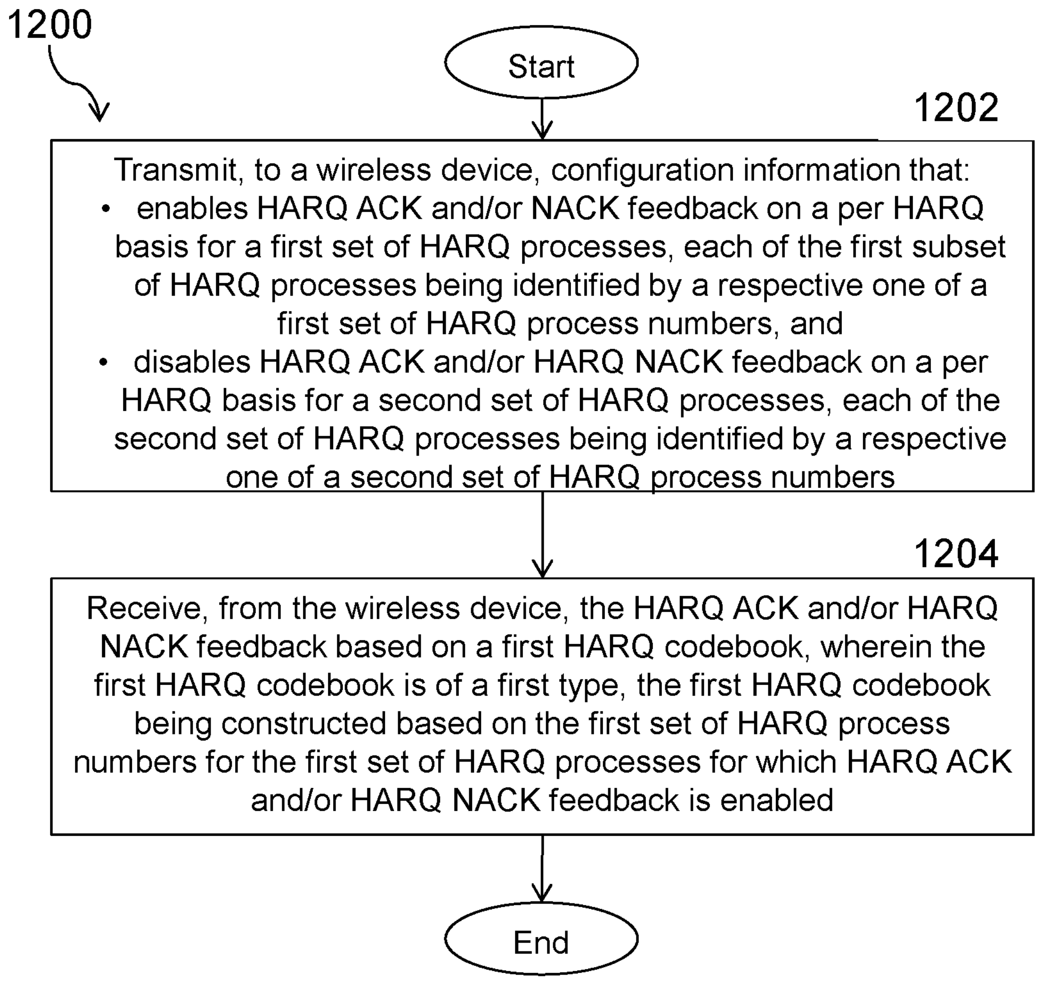
FIG. 17 illustrates an example method by a network node, according to certain embodiments.

FIG. 17 depicts a method 1200 by a network node 160, according to certain embodiments. At step 1202, the network node 160 transmits, to a wireless device 110, configuration information. The configuration information enables HARQ ACK and/or HARQ NACK feedback on a per HARQ basis for a first set of HARQ processes. Each of the first set of HARQ processes is identified by a respective one of a first set of HARQ process numbers, The configuration also disables HARQ ACK and/or HARQ NACK feedback, on a per HARQ process basis, for a second set of HARQ processes. Each of the second set of HARQ processes is identified by a respective one of a second set of HARQ process numbers. At step 1204, the network node 160 receives, from the wireless device 110, the HARQ ACK and/or HARQ NACK feedback based on a first HARQ codebook. The first HARQ codebook is of a first type, and the first HARQ codebook is constructed based on the first set of HARQ process numbers for the first set of HARQ processes for which HARQ ACK and/or HARQ NACK feedback is enabled.

In a particular embodiment, the first HARQ codebook of the first type is not constructed based on the second set of HARQ processes for which HARQ ACK and/or HARQ NACK feedback is disabled.

In a particular embodiment, the first HARQ codebook is a Type 3 HARQ codebook, and the network node 160 transmits DCI that triggers Type 3 HARQ Feedback.

In a further particular embodiment, the Type 3 HARQ codebook is used along with a HARQ codebook of Type 1, and a PDSCH reception corresponding to a particular HARQ process for which HARQ feedback is enabled is scheduled with an indication of an inapplicable value for the PDSCH-to-HARQ_feedback timing indicator field in the DCI triggering the HARQ ACK and/or HARQ NACK feedback. The HARQ ACK and/or HARQ NACK feedback for the particular HARQ process is subsequently obtained by triggering feedback for the Type 3 HARQ codebook.

In a particular embodiment, the network node 160 transmits, to the wireless device 110, DCI triggering the HARQ ACK and/or HARQ NACK feedback. The DCI indicates a transmission resource for sending the HARQ ACK and/or HARQ NACK feedback, and the HARQ ACK and/or HARQ NACK feedback is received from the wireless device using the transmission resource.

In a particular embodiment, the resource comprises a PUCCH resource for sending by the wireless device the HARQ ACK and/or HARQ NACK feedback, and the PUCCH resource is indicated based on a PUCCH resource indicator field in the DCI triggering the HARQ feedback.

Figure 18:
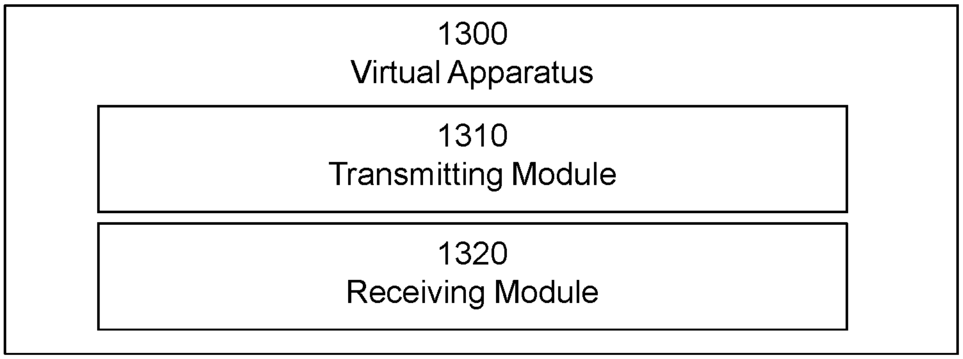
FIG. 18 illustrates another exemplary virtual computing device, according to certain embodiments.

FIG. 18 illustrates a schematic block diagram of a virtual apparatus 1300 in a wireless network (for example, the wireless network shown in FIG. 4). The apparatus may be implemented in a wireless device or network node (e.g., wireless device 110 or network node 160 shown in FIG. 4). Apparatus 1300 is operable to carry out the example method described with reference to FIG. 17 and possibly any other processes or methods disclosed herein. It is also to be understood that the method of FIG. 17 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1310, receiving module 1320, and any other suitable units of apparatus 1300 to perform corresponding functions according one or more embodiments of the present disclosure.

According to certain embodiments, transmitting module 1310 may perform certain of the transmitting functions of the apparatus 1300. For example, transmitting module 1310 may transmits, to a wireless device 110, configuration information. The configuration information enables HARQ ACK and/or HARQ NACK feedback on a per HARQ basis for a first set of HARQ processes. Each of the first set of HARQ processes is identified by a respective one of a first set of HARQ process numbers, The configuration also disables HARQ ACK and/or HARQ NACK feedback, on a per HARQ process basis, for a second set of HARQ processes. Each of the second set of HARQ processes is identified by a respective one of a second set of HARQ process numbers.

According to certain embodiments, receiving module 1320 may perform certain of the receiving functions of the apparatus 1300. For example, receiving module 1320 may receive, from the wireless device 110, the HARQ ACK and/or HARQ NACK feedback based on a first HARQ codebook. The first HARQ codebook is of a first type, and the first HARQ codebook is constructed based on the first set of HARQ process numbers for the first set of HARQ processes for which HARQ ACK and/or HARQ NACK feedback is enabled.

Example Embodiments

Example Embodiment 1. A method performed by a wireless device, the method comprising one or more of the following steps: receiving, from a network node, configuration information comprising: an indication disabling Hybrid Automatic Repeat Request Acknowledgment and/or Negative Acknowledgment (HARQ ACK and/or NACK) feedback on a per Hybrid Automatic Repeat Request (HARQ) basis for a first set of HARQ processes having HARQ ACK and/or NACK feedback disabled, each of the first subset of HARQ processes being identified by a respective one of a first set of HARQ process numbers; constructing a first HARQ codebook of a first type based on the first set of HARQ process numbers for first set of HARQ processes for which HARQ ACK and/or NACK feedback is enabled; sending, to the network node, the HARQ ACK and/or NACK feedback based on the first HARQ codebook.

Example Embodiment 2. The method of Embodiment 1, wherein the first HARQ codebook comprises as TYPE 3

HARQ codebook, and the method further comprises receiving Downlink Control Information (DCI) that triggers Type 3 HARQ Feedback.

Example Embodiment 3. The method of Embodiment 2, wherein: the TYPE 3 HARQ codebook is used along with a HARQ codebook of Type 1; and a PDSCH reception corresponding to a particular HARQ process for which HARQ feedback is enabled is scheduled with an indication of an inapplicable value for the PDSCH-to-HARQ_feedback timing indicator field in the DCI triggering the HARQ ACK and/or NACK feedback; and HARQ ACK and/or NACK feedback for the particular HARQ process is subsequently obtained by triggering feedback for the Type 3 HARQ codebook.

Example Embodiment 4. The method of any one of Embodiments 1 to 3, wherein the configuration information comprises HARQ ACK and/or NACK feedback enabling, on a per HARQ basis, a second set of HARQ processes having HARQ ACK and/or NACK feedback enabled, each of the second subset of HARQ processes being identified by a respective one of a second set of HARQ process numbers.

Example Embodiment 5. The method of any one of Embodiments 1 to 4, further comprising: based on Downlink Control Information (DCI) triggering HARQ ACK and/or NACK feedback, determining a transmission resource for sending the HARQ ACK and/or NACK feedback, and wherein the HARQ ACK and/or NACK feedback is sent to the network node using the transmission resource.

Example Embodiment 6. The method of Embodiment 5, wherein: the resource comprises a PUCCH resource for sending the HARQ ACK and/or NACK feedback, and the PUCH resource is determined based on a PUCCH resource indicator field in the DCI triggering the HARRQ feedback.

Example Embodiment 7. A method by a wireless device for providing Hybrid Automatic Repeat Request (HARQ) feedback with a Type 1 HARQ codebook, the method comprising: determining that a HARQ process associated with a HARQ process identifier is enabled; receiving a scheduling command that schedules a PDSCH reception corresponding to the HARQ process with an indication of an inapplicable value for the PDSCH-to-HARQ_feedback timing indicator field in a DCI message; and discarding HARQ feedback for the PDSCH such that HARQ feedback for the PDSCH reception is disabled.

Example Embodiment 8. The method of Embodiment 7, wherein determining that the HARQ process associated with the HARQ process identifier is enabled comprises: receiving, from a network node, a message comprising the HARQ process identifier, the message indicating that the HARQ process associated with HARQ process identifier is enabled.

Example Embodiment 9. A method by a wireless device for providing Hybrid Automatic Repeat Request (HARQ) feedback with a Type 2 HARQ codebook, the method comprising: receiving a DCI message comprising a DAI field; interpreting the DAI field in the DCI message as scheduling a PDSCH corresponding to a HARQ process that is disabled as the current true DAI value when the PDSCH-to-HARQ_feedback timing indicator field in the DCI message indicates an applicable value; and ignoring the DAI field in the DCI message scheduling a PDSCH corresponding to a HARQ process that is disabled when the PDSCH-to-HARQ_feedback timing indicator field in the DCI message indicates an inapplicable value (−1 in parameter dl-DataToUL-ACK configured by higher layers via RRC signaling).

Example Embodiment 10. A method by a wireless device for providing Hybrid Automatic Repeat Request (HARQ) feedback with a Type 2 HARQ codebook, the method comprising: obtaining information that the wireless device is scheduled with DCI format 1_1 for a PDSCH reception corresponding to at least one HARQ process with HARQ feedback enabled; obtaining information that the wireless device is scheduled with DCI format 1_2 for a PDSCH reception corresponding to at least one HARQ process with HARQ feedback disabled; and discarding HARQ feedback for any PDSCH scheduled using DCI format 1_2, and wherein a HARQ process number, DAI and RV fields are configured by higher layers to have 0 bits in DCI format 1_2.

Example Embodiment 11. A method by a wireless device for providing HARQ feedback with a Type 1 HARQ codebook, the method comprises: determining that the wireless device is scheduled with DCI format 1_1 for a PDSCH reception corresponding to at least one HARQ process with HARQ feedback enabled; determining that the wireless device is scheduled with DCI format 1_2 for a PDSCH reception corresponding to at least one HARQ process with HARQ feedback disabled, wherein the HARQ process number, DAI, and RV fields are configured by higher layers to have 0 bits in DCI format 1_2, wherein the wireless device is configured to be scheduled with the TDRA table pdsch-TimeDomainAllocationListForDCI-Format1-2 that is used only for scheduling PDSCHs with disabled HARQ processes, and wherein the pdsch-TimeDomainAllocationList-ForDCI-Format1-2 is excluded in a Type-1 HARQ codebook construction.

Example Embodiment 12. A method of constructing a Type-3 HARQ Codebook in a UE, the method involving one or more of the following steps: the UE receiving from the network configuration information from the gNB of HARQ ACK/NACK feedback enabling/disabling on a per HARQ process basis with a first subset of HARQ processes that have HARQ ACK/NACK feedback enabled and a second subset of HARQ processes that have HARQ ACK/NACK feedback disabled; the UE constructing the HARQ codebook based on the HARQ process numbers for which HARQ ACK/NACK feedback is enabled; the UE determining the PUCCH resource for sending the HARQ ACK/NACK feedback based on the PUCCH resource indicator field in the DCI triggering the Type 3 HARQ feedback; feeding back HARQ ACK/NACK based on the constructed HARQ codebook.

Example Embodiment 13. The method of 12, where the Type 3 HARQ codebook is used along with a HARQ codebook of Type 1, the PDSCH reception corresponding to a HARQ process for which HARQ feedback is enabled is scheduled with an indication of an inapplicable value for the PDSCH-to-HARQ_feedback timing indicator field in the DCI message, HARQ feedback for the HARQ process is subsequently obtained by triggering feedback for the Type 3 HARQ codebook.

Example Embodiment 14. A method of providing HARQ feedback with a Type 1 HARQ codebook, where the UE is configured with a HARQ process number as being enabled, the UE receives a scheduling command scheduling a PDSCH reception corresponding to the HARQ process with an indication of an inapplicable value for the PDSCH-to-HARQ_feedback timing indicator field in the DCI message, the UE discards the HARQ feedback for the PDSCH, thus disabling HARQ feedback for this PDSCH reception.

Example Embodiment 15. A method of providing HARQ feedback with a Type 2 HARQ codebook where the UE interprets the DAI field in a DCI message scheduling a PDSCH corresponding to a HARQ process that is disabled as the current true DAI value when the PDSCH-to- HARQ_feedback timing indicator field in the DCI message indicates an applicable value, the UE ignores the DAI field in a DCI message scheduling a PDSCH corresponding to a HARQ process that is disabled when the PDSCH-to-HARQ_feedback timing indicator field in the DCI message indicates an inapplicable value (−1 in parameter dl-DataToUL-ACK configured by higher layers via RRC signaling).

Example Embodiment 16. A method of providing HARQ feedback with a Type 2 HARQ codebook where: a UE is scheduled with DCI format 1_1 for PDSCH reception corresponding to HARQ processes with HARQ feedback enabled, a UE is scheduled with DCI format 1_2 for PDSCH reception corresponding to HARQ processes with HARQ feedback disabled, the HARQ process number, DAI and RV fields are configured by higher layers to have 0 bits in DCI format 1_2, and the UE discards HARQ feedback for any PDSCH scheduled using DCI format 1_2.

Example Embodiment 17. A method of providing HARQ feedback with a Type 1 HARQ codebook where: a UE is scheduled with DCI format 1_1 for PDSCH reception corresponding to HARQ processes with HARQ feedback enabled, a UE is scheduled with DCI format 1_2 for PDSCH reception corresponding to HARQ processes with HARQ feedback disabled, the HARQ process number, DAI and RV fields are configured by higher layers to have 0 bits in DCI format 1_2, the UE is configured to be scheduled with the TDRA table pdsch-TimeDomainAllocationListForDCI-Format1-2 that is used only for scheduling PDSCHs with disabled HARQ processes, the pdsch-TimeDomainAllocationListForDCI-Format1-2 is excluded in Type-1 HARQ codebook construction.

Example Embodiment 18. A computer program comprising instructions which when executed on a computer perform any of the methods of embodiments 1 to 17.

Example Embodiment 19. A computer program product comprising computer program, the computer program comprising instructions which when executed on a computer perform any of the methods of embodiments 1 to 17.

Example Embodiment 20. A non-transitory computer readable medium storing instructions which when executed by a computer perform any of the methods of embodiments 1 to 17.

Example Embodiment 21. A wireless device comprising processing circuitry configured to perform any of the methods of embodiments 1 to 17.

Example Embodiment 22. A method performed by a network node, the method comprising one or more of the following steps: transmitting, to a wireless device, configuration information comprising: an indication disabling Hybrid Automatic Repeat Request Acknowledgment and/or Negative Acknowledgment (HARQ ACK and/or NACK) feedback on a per Hybrid Automatic Repeat Request (HARQ) basis for a first set of HARQ processes having HARQ ACK and/or NACK feedback disabled, each of the first subset of HARQ processes being identified by a respective one of a first set of HARQ process numbers; and receiving, from the wireless device, the HARQ ACK and/or NACK feedback based on a first HARQ codebook, wherein the first HARQ codebook is of a first type, the first HARQ codebook being constructed based on the first set of HARQ process numbers for the first set of HARQ processes for which HARQ ACK and/or NACK feedback is enabled.

Example Embodiment 23. The method of Embodiment 22, wherein the first HARQ codebook comprises as TYPE 3 HARQ codebook, and the method further comprises receiving Downlink Control Information (DCI) that triggers Type 3 HARQ Feedback.

Example Embodiment 24. The method of Embodiment 23, wherein: the TYPE 3 HARQ codebook is used along with a HARQ codebook of Type 1; and a PDSCH reception corresponding to a particular HARQ process for which HARQ feedback is enabled is scheduled with an indication of an inapplicable value for the PDSCH-to-HARQ_feedback timing indicator field in the DCI triggering the HARQ ACK and/or NACK feedback; and HARQ ACK and/or NACK feedback for the particular HARQ process is subsequently obtained by triggering feedback for the Type 3 HARQ codebook.

Example Embodiment 25. The method of any one of Embodiments 22 to 24, wherein the configuration information comprises HARQ ACK and/or NACK feedback enabling, on a per HARQ basis, a second set of HARQ processes having HARQ ACK and/or NACK feedback enabled, each of the second subset of HARQ processes being identified by a respective one of a second set of HARQ process numbers.

Example Embodiment 26. The method of any one of Embodiments 22 to 25, further comprising: transmitting, to the wireless device, Downlink Control Information (DCI) triggering the HARQ ACK and/or NACK feedback, the DCI indicating a transmission resource for sending the HARQ ACK and/or NACK feedback, and wherein the HARQ ACK and/or NACK feedback is received from the wireless device using the transmission resource.

Example Embodiment 27. The method of Embodiment 26, wherein: the resource comprises a PUCCH resource for sending by the wireless device the HARQ ACK and/or NACK feedback, and the PUCH resource is indicated based on a PUCCH resource indicator field in the DCI triggering the HARRQ feedback.

Example Embodiment 28. A method by a network node for receiving Hybrid Automatic Repeat Request (HARQ) feedback with a Type 1 HARQ codebook, the method comprising: transmitting, to a wireless device, a message indicating that a HARQ process associated with a HARQ process identifier is enabled; transmitting, to the wireless device, a scheduling command that schedules a PDSCH reception corresponding to the HARQ process with an indication of an inapplicable value for the PDSCH-to-HARQ_feedback timing indicator field in a DCI message; and configuring the wireless device to discard HARQ feedback for the PDSCH such that HARQ feedback for the PDSCH reception is disabled.

Example Embodiment 29. A method by a network node for receiving Hybrid Automatic Repeat Request (HARQ) feedback with a Type 2 HARQ codebook, the method comprising: configuring a wireless device to interpret the DAI field in a DCI message as scheduling a PDSCH corresponding to a HARQ process that is disabled as the current true DAI value when the PDSCH-to-HARQ_feedback timing indicator field in the DCI message indicates an applicable value; configuring the wireless device to ignore the DAI field in the DCI message scheduling a PDSCH corresponding to a HARQ process that is disabled when the PDSCH-to-HARQ_feedback timing indicator field in the DCI message indicates an inapplicable value (−1 in parameter dl-DataToUL-ACK configured by higher layers via RRC signaling); and transmitting, to the wireless device, the DCI message comprising the DAI field.

Example Embodiment 30. A method by a network node for receiving Hybrid Automatic Repeat Request (HARQ) feedback with a Type 2 HARQ codebook, the method comprising: transmitting, to a wireless device, information scheduling the wireless device with DCI format 1_1 for a PDSCH reception corresponding to at least one HARQ process with HARQ feedback enabled; transmitting, to the wireless device, information scheduling the wireless device with DCI format 1_2 for a PDSCH reception corresponding to at least one HARQ process with HARQ feedback disabled; and configuring the wireless device to discard HARQ feedback for any PDSCH scheduled using DCI format 1_2, and wherein a HARQ process number, DAI and RV fields are configured by higher layers to have 0 bits in DCI format 1_2.

Example Embodiment 31. A method by a wireless device for providing HARQ feedback with a Type 1 HARQ codebook, the method comprises: scheduling a wireless device with DCI format 1_1 for a PDSCH reception corresponding to at least one HARQ process with HARQ feedback enabled; scheduling the wireless device with DCI format 1_2 for a PDSCH reception corresponding to at least one HARQ process with HARQ feedback disabled, wherein the HARQ process number, DAI, and RV fields are configured by higher layers to have 0 bits in DCI format 1_2, wherein the wireless device is configured to be scheduled with the TDRA table pdsch-TimeDomainAllocationListForDCI-Format1-2 that is used only for scheduling PDSCHs with disabled HARQ processes, and wherein the pdsch-TimeDomainAllocationListForDCI-Format1-2 is excluded in a Type-1 HARQ codebook construction.

Example Embodiment 32. A computer program comprising instructions which when executed on a computer perform any of the methods of embodiments 22 to 31.

Example Embodiment 33. A computer program product comprising computer program, the computer program comprising instructions which when executed on a computer perform any of the methods of embodiments 22 to 31.

Example Embodiment 34. A non-transitory computer readable medium storing instructions which when executed by a computer perform any of the methods of embodiments 22 to 31.

Example Embodiment 35. A wireless device comprising processing circuitry configured to perform any of the methods of embodiments 22 to 31.

Example Embodiment 36. A wireless device comprising: processing circuitry configured to perform any of the steps of any of Example Embodiments 1 to 21; and power supply circuitry configured to supply power to the wireless device.

Example Embodiment 37. A network node comprising: processing circuitry configured to perform any of the steps of any of Example Embodiments 22 to 35; power supply circuitry configured to supply power to the wireless device.

Example Embodiment 38. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 21; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 39. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Example Embodiments 22 to 35.

Example Embodiment 40. The communication system of the pervious embodiment further including the network node.

Example Embodiment 41. The communication system of the previous 2 embodiments, further including the wireless device, wherein the wireless device is configured to communicate with the network node.

Example Embodiment 42. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 43. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of Example Embodiments 22 to 35.

Example Embodiment 44. The method of the previous embodiment, further comprising, at the network node, transmitting the user data.

Example Embodiment 45. The method of the previous 2 embodiments, wherein the user data is provided at the host computer by executing a host application, the method further comprising, at the wireless device, executing a client application associated with the host application.

Example Embodiment 46. A wireless device configured to communicate with a network node, the wireless device comprising a radio interface and processing circuitry configured to performs the of the previous 3 embodiments.

Example Embodiment 47. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of Example Embodiments 1 to 21.

Example Embodiment 48. The communication system of the previous embodiment, wherein the cellular network further includes a network node configured to communicate with the wireless device.

Example Embodiment 49. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 50. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of Example Embodiments 1 to 21.

Example Embodiment 51. The method of the previous embodiment, further comprising at the wireless device, receiving the user data from the network node.

Example Embodiment 52. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of Example Embodiments 1 to 21.

Example Embodiment 53. The communication system of the previous embodiment, further including the wireless device.

Example Embodiment 54. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 55. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 56. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 57. A method implemented in a communication system including a host computer, a network node and a wireless device, the method comprising: at the host computer, receiving user data transmitted to the network node from the wireless device, wherein the wireless device performs any of the steps of any of Example Embodiments 1 to 21.

Example Embodiment 58. The method of the previous embodiment, further comprising, at the wireless device, providing the user data to the network node.

Example Embodiment 59. The method of the previous 2 embodiments, further comprising: at the wireless device, executing a client application, thereby providing the user data to be transmitted; and at the host computer, executing a host application associated with the client application.

Example Embodiment 60. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 61. A communication system including a host computer comprising a communication interface configured to receive user data originating from a transmission from a wireless device to a network node, wherein the network node comprises a radio interface and processing circuitry, the network node's processing circuitry configured to perform any of the steps of any of Example Embodiments 22 to 35.

Example Embodiment 62. The communication system of the previous embodiment further including the network node.

Example Embodiment 63. The communication system of the previous 2 embodiments, further including the wireless device, wherein the wireless device is configured to communicate with the network node.

Example Embodiment 64. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 65. A method implemented in a communication system including a host computer, a network node and a wireless device, the method comprising: at the host computer, receiving, from the base station, user data originating from a transmission which the network node has received from the wireless device, wherein the wireless device performs any of the steps of any of Example Embodiments 1 to 21.

Example Embodiment 66. The method of the previous embodiment, further comprising at the network node receiving the user data from the wireless device.

Example Embodiment 67. The method of the previous 2 embodiments, further comprising at the network node, initiating a transmission of the received user data to the host computer.

Example Embodiment 68. The method of any of the previous embodiments, wherein the network node comprises a base station.

Example Embodiment 69. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method by a wireless device comprising:

receiving, from a network node, configuration information, wherein the configuration information configures the wireless device to provide feedback in one shot for all HARQ processes across all activated cells, the configuration information further comprising information which:

enables Hybrid Automatic Repeat Request Acknowledgment, HARQ ACK, and/or Negative Acknowledgment, HARQ NACK, feedback on a per Hybrid Automatic Repeat Request, HARQ, process basis for a first set of HARQ processes, each of the first set of HARQ processes being identified by a respective one of a first set of HARQ process numbers, and disables HARQ ACK and/or HARQ NACK feedback, on a per HARQ process basis, for a second set of HARQ processes, each of the second set of HARQ processes being identified by a respective one of a second set of HARQ process numbers;

constructing Type 3 HARQ codebook of a first type based on the first set of HARQ process numbers for the first set of HARQ processes for which HARQ ACK and/or HARQ NACK feedback is enabled, and wherein the Type 3 HARQ codebook is not constructed based on the second set of HARQ processes for which HARQ ACK and/or HARQ NACK feedback is disabled; and sending, to the network node, the HARQ ACK and/or HARQ NACK feedback based on the Type 3 HARQ codebook.

2. The method of claim 1, further comprising receiving Downlink Control Information, DCI, that triggers Type 3 HARQ Feedback.

3. The method of claim 2, wherein:

the TYPE 3 HARQ codebook is used along with a HARQ codebook of Type 1; and a Physical Downlink Shared Channel, PDSCH, reception corresponding to a particular HARQ process for which the HARQ ACK and/or HARQ NACK feedback is enabled is scheduled with an indication of an inapplicable value for the PDSCH-to-HARQ feedback timing indicator field in the DCI triggering the HARQ ACK and/or HARQ NACK feedback; and the HARQ ACK and/or HARQ NACK feedback for the particular HARQ process is subsequently obtained by triggering feedback for the Type 3 HARQ codebook.

4. The method of claim 1, further comprising:

based on Downlink Control Information, DCI, triggering HARQ ACK and/or HARQ NACK feedback, determining a transmission resource for sending the HARQ ACK and/or HARQ NACK feedback, and wherein the HARQ ACK and/or HARQ NACK feedback is sent to the network node using the transmission resource.

5. The method of claim 4, wherein:

the transmission resource comprises a Physical Uplink Control Channel, PUCCH, resource for sending the HARQ ACK and/or HARQ NACK feedback, and the PUCCH resource is determined based on a PUCCH resource indicator field in the DCI triggering the HARQ ACK and/or HARQ NACK feedback.

6. A method by a network node comprising:

transmitting, to a wireless device, configuration information, wherein the configuration information configures the wireless device to provide feedback in one shot for all HARQ processes across all activated cells, the configuration information further comprising information which:

enables Hybrid Automatic Repeat Request Acknowledgment, HARQ ACK, and/or Negative Acknowledgment, HARQ NACK, feedback on a per Hybrid Automatic Repeat Request, HARQ, process basis for a first set of HARQ processes, each of the first set of HARQ processes being identified by a respective one of a first set of HARQ process numbers, and disables HARQ ACK and/or HARQ NACK feedback, on a per HARQ process basis, for a second set of HARQ processes, each of the second set of HARQ processes being identified by a respective one of a second set of HARQ process numbers; and receiving, from the wireless device, the HARQ ACK and/or HARQ NACK feedback based on a Type 3 HARQ codebook, the Type 3 HARQ codebook being constructed based on the first set of HARQ process numbers for the first set of HARQ processes for which HARQ ACK and/or HARQ NACK feedback is enabled and wherein the Type 3 HARQ codebook is not constructed based on the second set of HARQ processes for which HARQ ACK and/or HARQ NACK feedback is disabled.

7. The method of claim 6, further comprising transmitting Downlink Control Information, DCI, that triggers Type 3 HARQ Feedback.

8. The method of claim 7, wherein:

the Type 3 HARQ codebook is used along with a HARQ codebook of Type 1; and a Physical Downlink Shared Channel, PDSCH, reception corresponding to a particular HARQ process for which the HARQ ACK and/or HARQ NACK feedback is enabled is scheduled with an indication of an inapplicable value for the PDSCH-to-HARQ feedback timing indicator field in the DCI triggering the HARQ ACK and/or HARQ NACK feedback; and the HARQ ACK and/or HARQ NACK feedback for the particular HARQ process is subsequently obtained by triggering feedback for the Type 3 HARQ codebook.

9. The method of claim 6, further comprising:

transmitting, to the wireless device, Downlink Control Information, DCI, triggering the HARQ ACK and/or HARQ NACK feedback, the DCI indicating a transmission resource for sending the HARQ ACK and/or HARQ NACK feedback, and wherein the HARQ ACK and/or HARQ NACK feedback is received from the wireless device using the transmission resource.

10. The method of claim 9, wherein:

the transmission resource comprises a Physical Uplink Control Channel, PUCCH, resource for sending by the wireless device the HARQ ACK and/or HARQ NACK feedback, and the PUCCH resource is indicated based on a PUCCH resource indicator field in the DCI triggering the HARQ ACK and/or HARQ NACK feedback.

11. A wireless device adapted to:

receive, from a network node, configuration information, wherein the configuration information configures the wireless device to provide feedback in one shot for all HARQ processes across all activated cells, the configuration information further comprising information which:

enables Hybrid Automatic Repeat Request Acknowledgment, HARQ ACK, and/or Negative Acknowledgment, HARQ NACK, feedback on a per Hybrid Automatic Repeat Request, HARQ, process basis for a first set of HARQ processes, each of the first set of HARQ processes being identified by a respective one of a first set of HARQ process numbers, and disables HARQ ACK and/or HARQ NACK feedback, on a per HARQ process basis, for a second set of HARQ processes, each of the second set of HARQ processes being identified by a respective one of a second set of HARQ process numbers;

construct a Type 3 HARQ codebook based on the first set of HARQ process numbers for the first set of HARQ processes for which HARQ ACK and/or HARQ NACK feedback is enabled, and wherein the Type 3 HARQ codebook is not constructed based on the second set of HARQ processes for which HARQ ACK and/or HARQ NACK feedback is disabled; and send, to the network node, the HARQ ACK and/or HARQ NACK feedback based on the Type 3 HARQ codebook.

12. The wireless device of claim 11, further comprising receiving Downlink Control Information, DCI, that triggers Type 3 HARQ Feedback.

13. The wireless device of claim 12, wherein:

the TYPE 3 HARQ codebook is used along with a HARQ codebook of Type 1; and a Physical Downlink Shared Channel, PDSCH, reception corresponding to a particular HARQ process for which the HARQ ACK and/or HARQ NACK feedback is enabled is scheduled with an indication of an inapplicable value for the PDSCH-to-HARQ feedback timing indicator field in the DCI triggering the HARQ ACK and/or HARQ NACK feedback; and the HARQ ACK and/or HARQ NACK feedback for the particular HARQ process is subsequently obtained by triggering feedback for the Type 3 HARQ codebook.

14. The wireless device of claim 11, wherein the wireless device is adapted to:

based on Downlink Control Information, DCI, triggering HARQ ACK and/or HARQ NACK feedback, determine a transmission resource for sending the HARQ ACK and/or HARQ NACK feedback, and wherein the HARQ ACK and/or HARQ NACK feedback is sent to the network node using the transmission resource.

15. The wireless device of claim 14, wherein:

the transmission resource comprises a Physical Uplink Control Channel, PUCCH, resource for sending the HARQ ACK and/or HARQ NACK feedback, and the PUCCH resource is determined based on a PUCCH resource indicator field in the DCI triggering the HARQ ACK and/or HARQ NACK feedback.

16. A network node adapted to:

transmit, to a wireless device, configuration information, wherein the configuration information configures the wireless device to provide feedback in one shot for all HARQ processes across all activated cells, the configuration information further comprising information which:

enables Hybrid Automatic Repeat Request Acknowledgment, HARQ ACK, and/or Negative Acknowledgment, HARQ NACK, feedback on a per Hybrid Automatic Repeat Request, HARQ, process basis for a first set of HARQ processes, each of the first set of HARQ processes being identified by a respective one of a first set of HARQ process numbers, and disables HARQ ACK and/or HARQ NACK feedback, on a per HARQ process basis, for a second set of HARQ processes, each of the second set of HARQ processes being identified by a respective one of a second set of HARQ process numbers; and receive, from the wireless device, the HARQ ACK and/or HARQ NACK feedback based on a Type 3 HARQ codebook, the Type 3 HARQ codebook being constructed based on the first set of HARQ process numbers for the first set of HARQ processes for which HARQ ACK and/or HARQ NACK feedback is enabled and wherein the Type 3 HARQ codebook is not constructed based on the second set of HARQ processes for which HARQ ACK and/or HARQ NACK feedback is disabled.

17. The network node of claim 16, further comprising transmitting Downlink Control Information, DCI, that triggers Type 3 HARQ Feedback.

18. The network node of claim 17, wherein:

the Type 3 HARQ codebook is used along with a HARQ codebook of Type 1; and a Physical Downlink Shared Channel, PDSCH, reception corresponding to a particular HARQ process for which the HARQ ACK and/or HARQ NACK feedback is enabled is scheduled with an indication of an inapplicable value for the PDSCH-to-HARQ feedback timing indicator field in the DCI triggering the HARQ ACK and/or HARQ NACK feedback; and the HARQ ACK and/or HARQ NACK feedback for the particular HARQ process is subsequently obtained by triggering feedback for the Type 3 HARQ codebook.

19. The network node of claim 16, wherein the network node is adapted to:

transmit, to the wireless device, Downlink Control Information, DCI, triggering the HARQ ACK and/or HARQ NACK feedback, the DCI indicating a transmission resource for sending the HARQ ACK and/or HARQ NACK feedback, and wherein the HARQ ACK and/or HARQ NACK feedback is received from the wireless device using the transmission resource.

20. The network node of claim 19, wherein:

the transmission resource comprises a Physical Uplink Control Channel, PUCCH, resource for sending by the wireless device the HARQ ACK and/or HARQ NACK feedback, and the PUCCH resource is indicated based on a PUCCH resource indicator field in the DCI triggering the HARQ ACK and/or HARQ NACK feedback.

* * * * *